(12) United States Patent
Mulhern

(10) Patent No.: US 9,247,796 B1
(45) Date of Patent: Feb. 2, 2016

(54) CRADLE-CASSETTE APPARATUS FOR AN ELECTRONIC DEVICE

(71) Applicant: Iordanka Koleva Mulhern, Milwaukee, WI (US)

(72) Inventor: Iordanka Koleva Mulhern, Milwaukee, WI (US)

(73) Assignee: WORLD RICHMAN MANUFACTURING CORPORATION, Elgin, IL (US)

( * ) Notice: Subject to any disclaimer, the term of this patent is extended or adjusted under 35 U.S.C. 154(b) by 0 days.

(21) Appl. No.: 14/447,797

(22) Filed: Jul. 31, 2014

(51) Int. Cl.
*A45C 11/00* (2006.01)

(52) U.S. Cl.
CPC ............ *A45C 11/00* (2013.01); *A45C 2011/003* (2013.01)

(58) Field of Classification Search
CPC .............. A45C 11/00; A45C 2011/002; A45C 2011/003; A45C 2013/025; G06F 1/1628
USPC .......................................... 206/305, 320, 472
See application file for complete search history.

(56) References Cited

U.S. PATENT DOCUMENTS

| | | | |
|---|---|---|---|
| 3,562,796 A | 2/1971 | Jacobson | |
| 4,989,926 A | 2/1991 | Snow, Jr. | |
| 5,128,829 A | 7/1992 | Loew | |
| 5,184,722 A | 2/1993 | Shin et al. | |
| 5,363,969 A | 11/1994 | Shen | |
| 5,570,780 A * | 11/1996 | Miller | 206/305 |
| D379,048 S | 5/1997 | Ros et al. | |
| 5,845,366 A | 12/1998 | Kuroda | |
| 6,029,871 A | 2/2000 | Park | |
| 6,078,908 A | 6/2000 | Schmitz | |
| 6,239,968 B1 | 5/2001 | Kim et al. | |
| 6,445,577 B1 | 9/2002 | Madsen et al. | |
| 6,971,622 B2 | 12/2005 | Ziegler et al. | |
| 7,032,984 B2 | 4/2006 | Kim et al. | |
| 7,111,773 B1 | 9/2006 | So et al. | |
| 7,743,999 B1 | 6/2010 | Griffin | |
| 8,047,365 B1 | 11/2011 | Lin et al. | |
| D654,263 S | 2/2012 | Mahmood et al. | |
| 8,348,055 B2 | 1/2013 | Loban | |
| 8,453,836 B1 * | 6/2013 | Wang et al. | 206/320 |
| 8,459,453 B2 | 6/2013 | Parker et al. | |
| 2004/0157653 A1 | 8/2004 | Kato | |
| 2007/0165371 A1 | 7/2007 | Brandenburg | |
| 2009/0120980 A1 | 5/2009 | Calayo | |
| 2011/0297564 A1 | 12/2011 | Kim et al. | |
| 2012/0074006 A1 | 3/2012 | Monaco et al. | |
| 2013/0032617 A1 | 2/2013 | Adelman et al. | |
| 2013/0178155 A1 | 7/2013 | Shulenberger | |

* cited by examiner

*Primary Examiner* — Bryon Gehman
(74) *Attorney, Agent, or Firm* — Christopher J. Scott

(57) ABSTRACT

A cradle-cassette apparatus encases and selectively displays an electronic device such as a mobile communications device. The cradle-cassette apparatus includes a cradle and a cassette. The cradle is sized and shaped to removably receive such an electronic device. The cradle includes anterior, posterior, superior, inferior, and lateral cradle sections. The cassette is sized and shaped to translatably receive the cradle construction. The cassette includes anterior, posterior, superior, inferior, and lateral cassette sections. A hinge-axis is provided by way of cooperative structure associated with the lateral cradle and cassette sections. The cradle construction is thus translatably displaceable relative to the cassette construction for positioning the cradle-cassette apparatus in either a cradle-closed position or a cradle-exposed position. The anterior cradle and cassette sections face in the same direction when in the cradle-exposed position, and the anterior cradle and cassette sections facing in opposite directions when in the cradle-closed position.

20 Claims, 26 Drawing Sheets

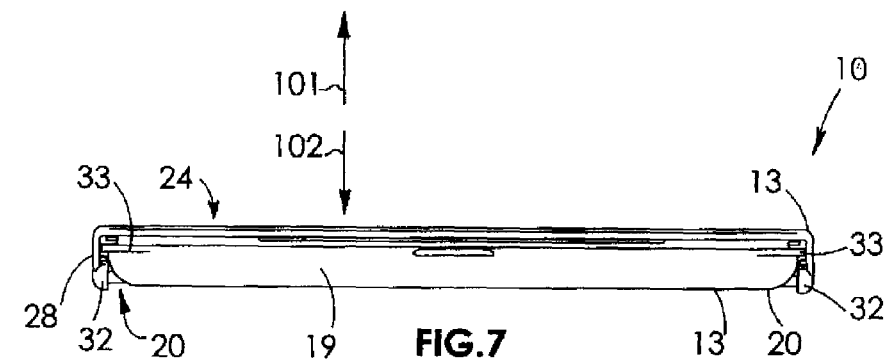
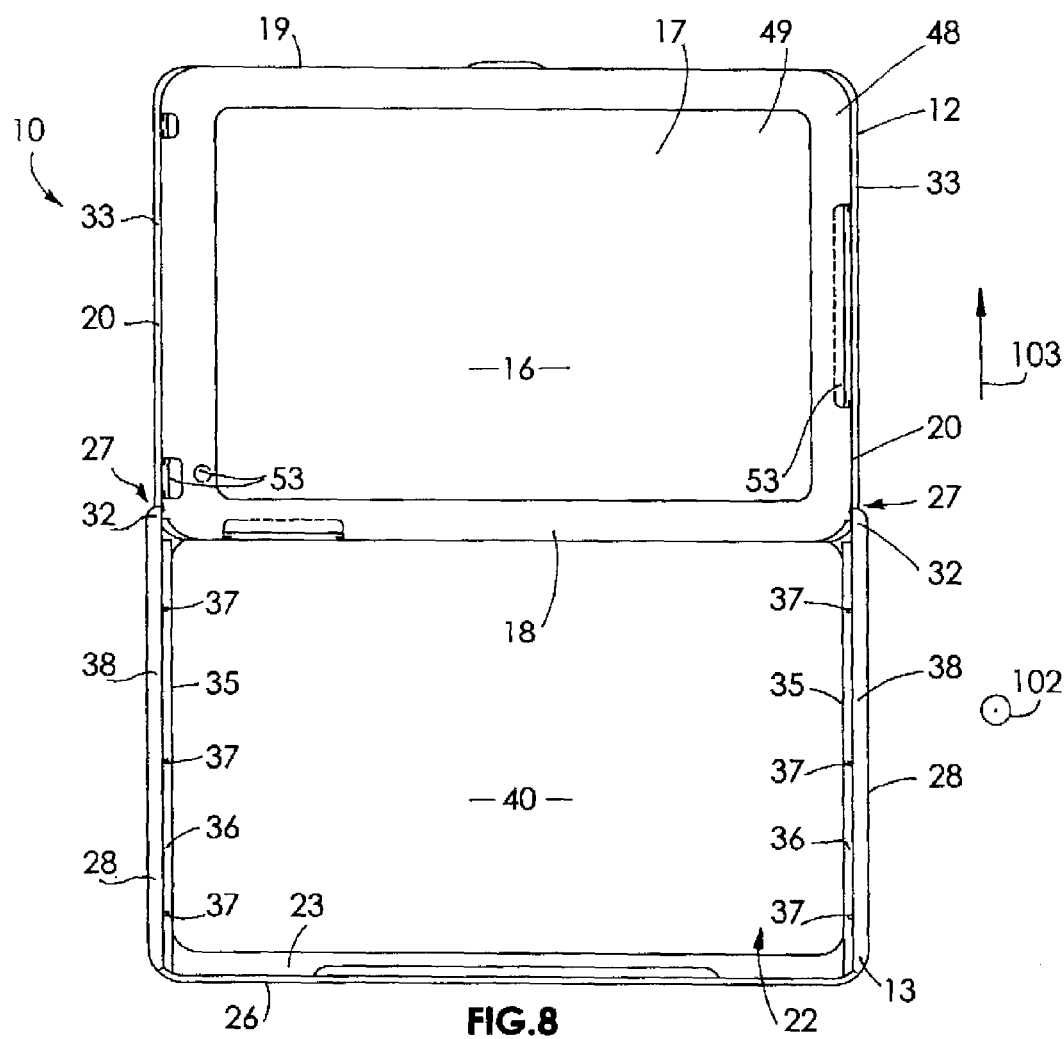

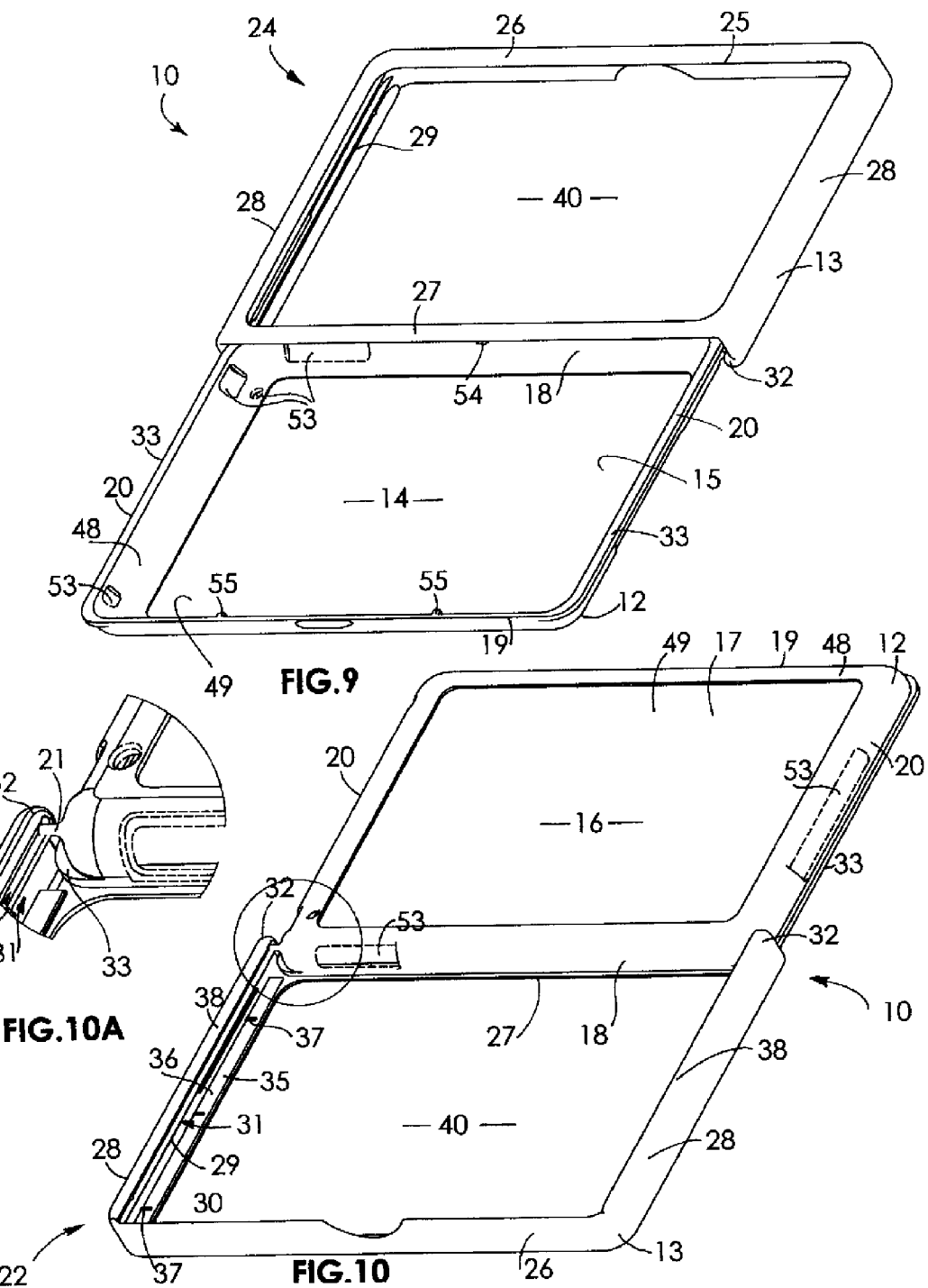

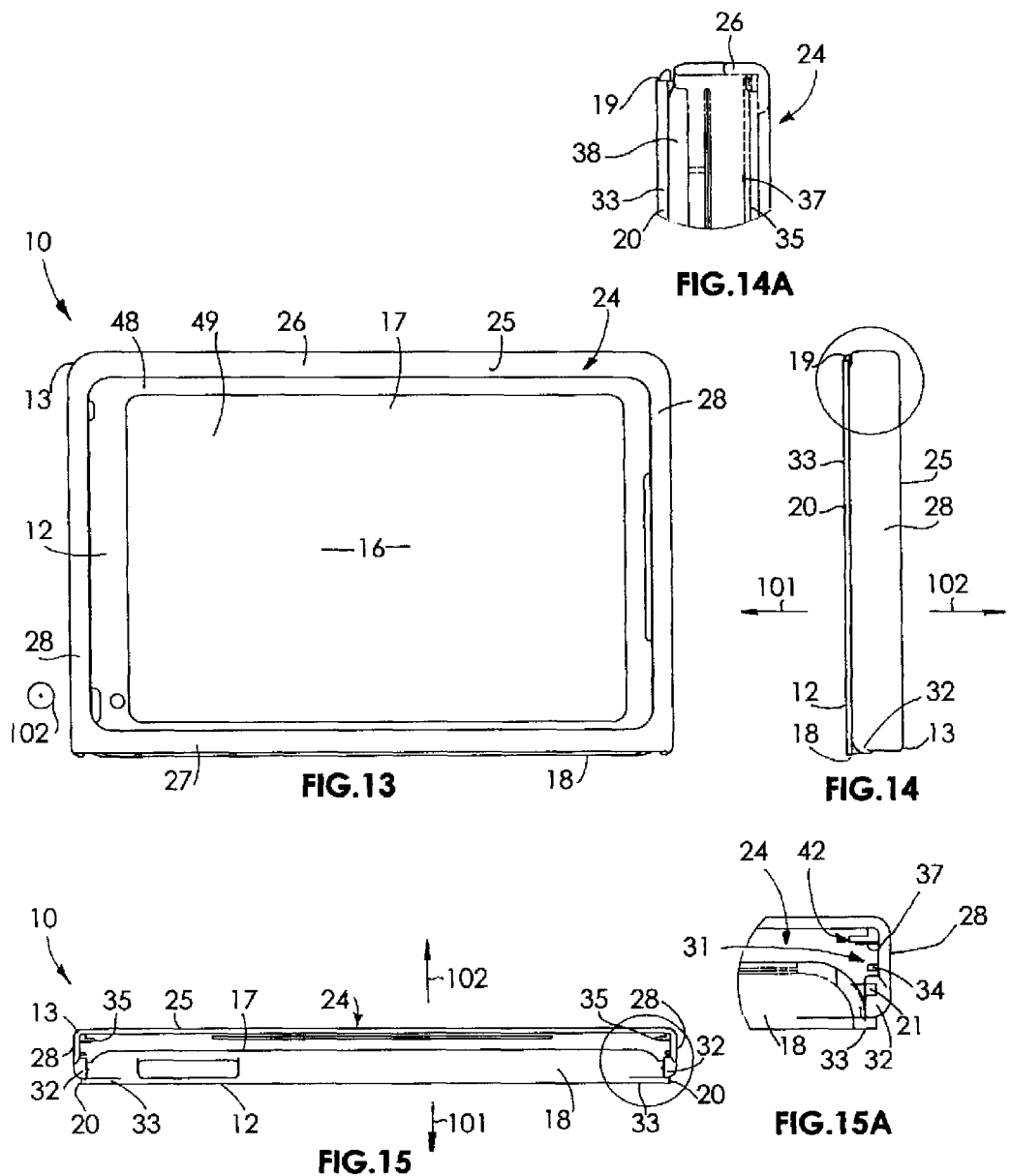

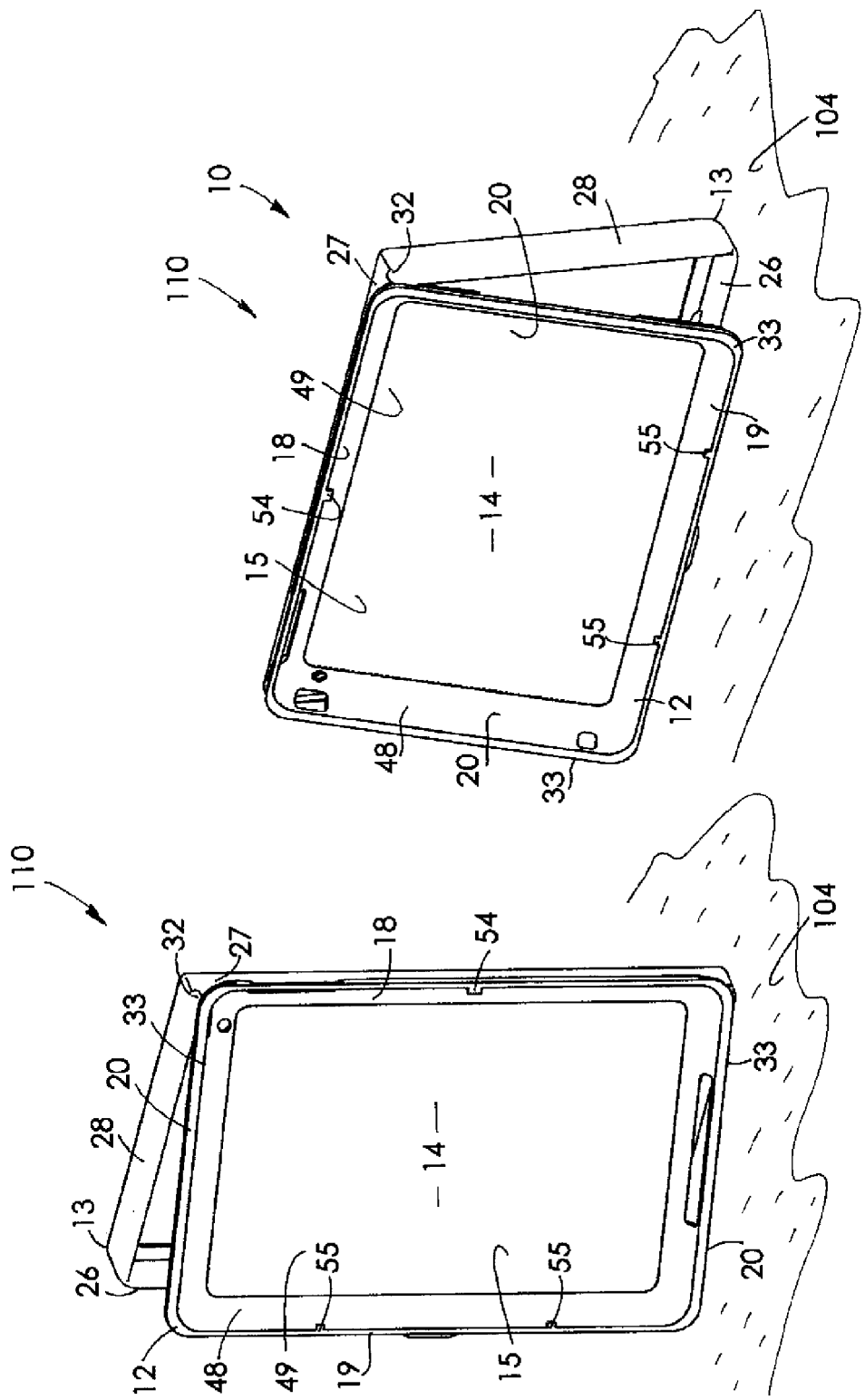

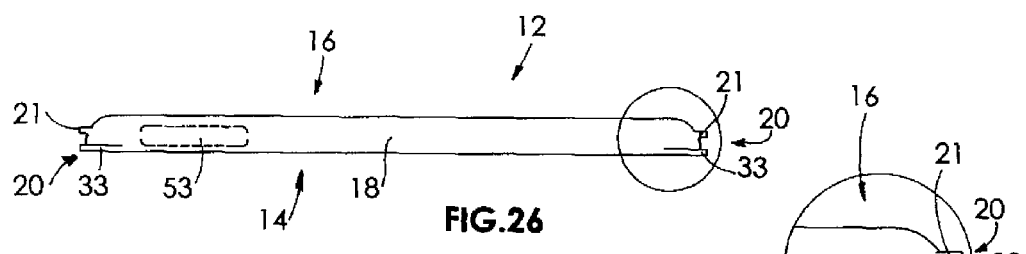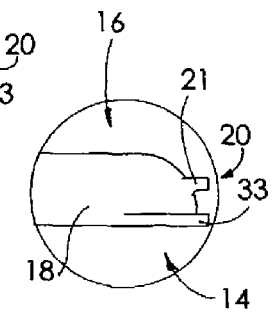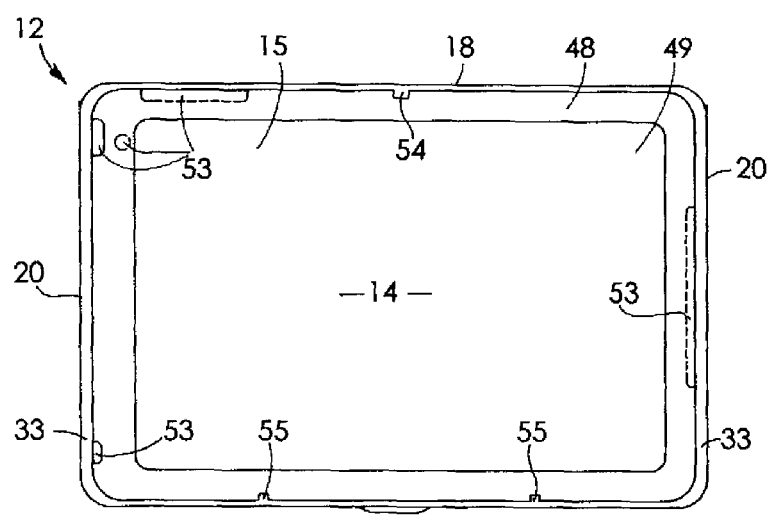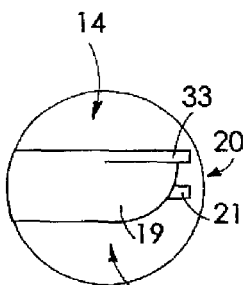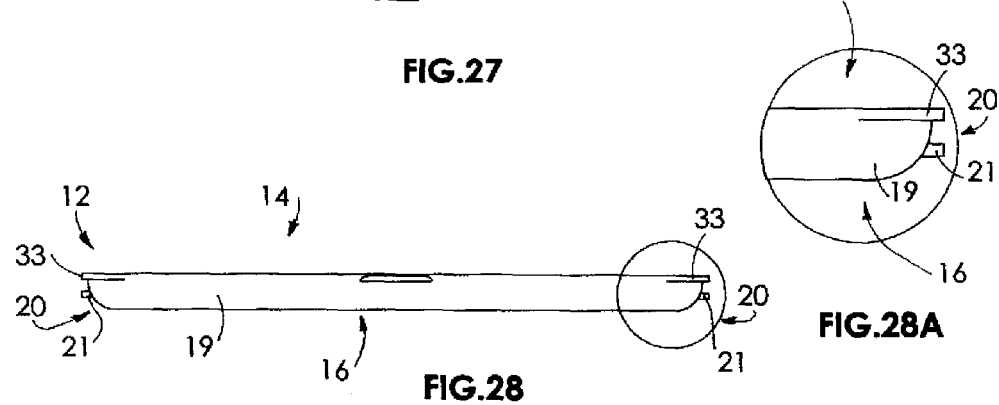

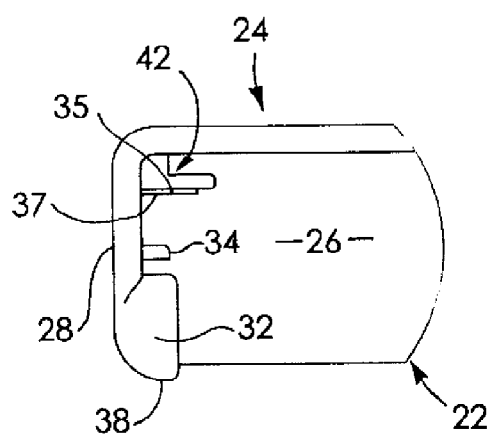
FIG.41A
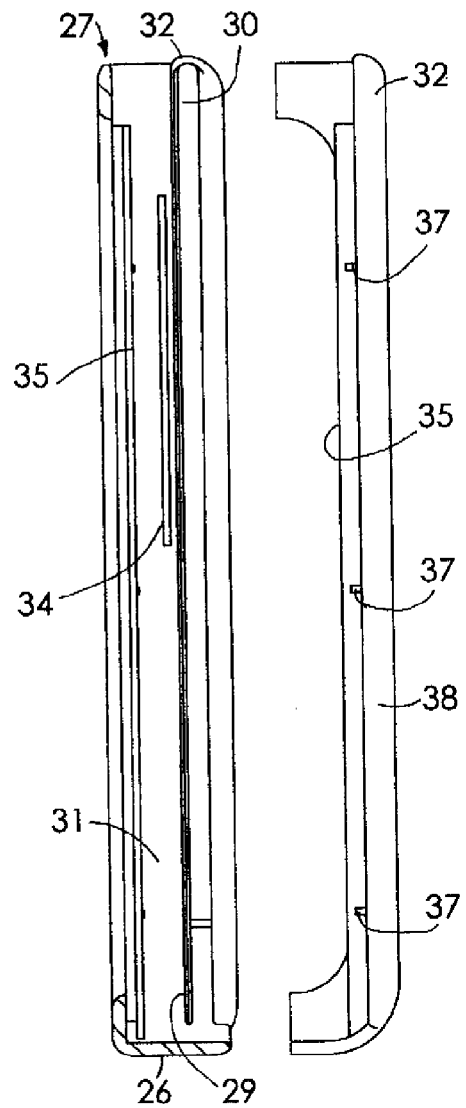
FIG.41B  FIG.41C
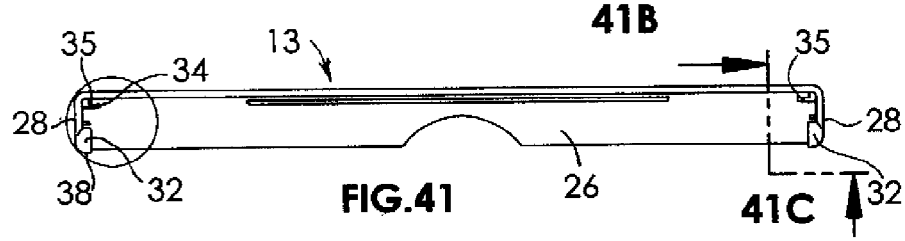
FIG.41

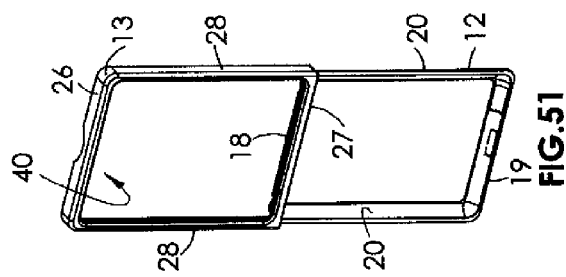
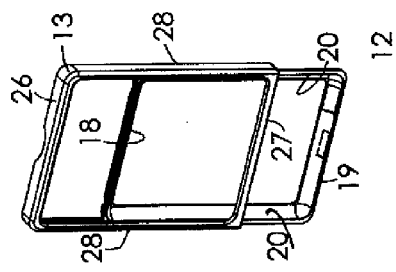
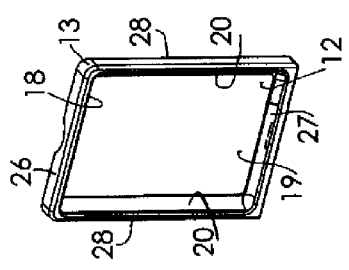
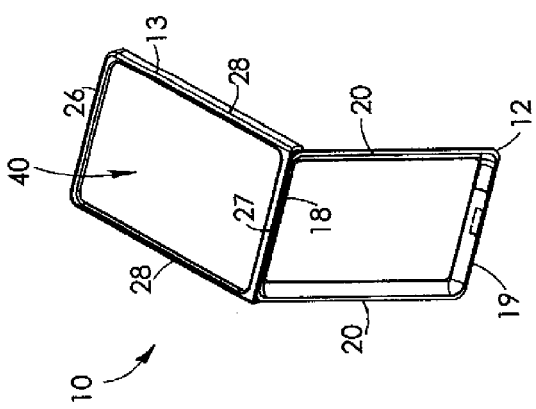
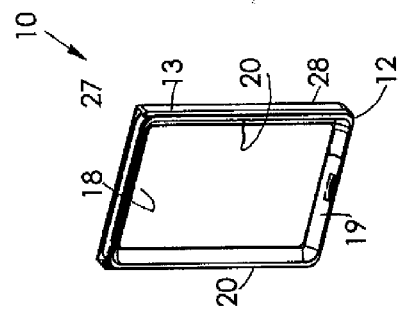
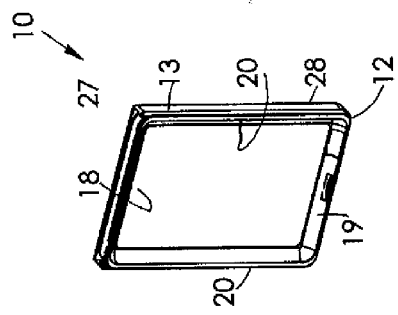

CRADLE-CASSETTE APPARATUS FOR AN ELECTRONIC DEVICE

BACKGROUND OF THE INVENTION

1. Field of the Invention

The disclosed invention generally relates to a case-like construction for cradling and selectively positioning a cradled electronic device such as a laptop type computer or tablet. More particularly, the disclosed invention provides a cradle-cassette combination apparatus for enabling a user to encase or cradle an electronic device and selectively display the electronic device for translating and rotating the cradle construction of the combination relative to the cassette construction of the combination.

2. Brief Description of the Prior Art

Case constructions for use in combination with electronic devices such as tablet type computers and the like are well known in this field of art. While the basic function of a basic case construction is to protect and/or enclose the device it encases, the art continues to develop with an eye toward enhancing functionality of the case constructions so as to provide the user with various means of manipulating and/or re-positioning the devices.

For example, it may be desirable to rotate and/or linearly displace the electronic device for different views or positions, while generally supporting the device within or as attached to the basal case construction. When the tablet computer or similar device is supported in its carrying case during use thereof, the multi-function use of the case provides great advantages for utility thereof, while keeping a structure for the improved use to a minimum.

It is further noted that tablet type computers and the like are manufactured in a variety of sizes and shapes. Accordingly, it is beneficial for a computer mounting device to adjust to the size and/or contours of the respective device(s), while still providing the desired holding and re-positioning capabilities. A few of the more pertinent prior art patent-related disclosures relating to cradle-like devices for holding and enabling the re-positioning of the devices they hold are described hereinafter.

United States Patent Application Publication No. 2006/0187696 ('696 Publication), authored by Lanni, discloses a Cradle for Receiving an Adapter. The '696 Publication describes a cradle casing having a DC/DC adapter to receive DC power from a DC power source and generate a first DC power signal. A sleeve accepts an AC/DC adapter, and guides movement of the AC/DC adapter when the AC/DC adapter is inserted into the cradle casing. The AC/DC adapter is capable of receiving AC power from an AC power source and generating a second DC power signal. A circuit receives at least one of the first DC power signal and the second DC power signal and outputs a third DC power signal.

United States Patent Application Publication No. 2008/0002369 ('369 Publication), authored by Carnevali, discloses a Portable Device Docking Station. The '369 Publication describes an external expanding apparatus or "docking station" operable with a portable computer device of a type having a display unit having a display screen on an inner surface thereof and a hard shell backing surface opposite thereof and pivotally mounted on a substantially rigid casing having a pair of locating holes adjacent to opposite corners of a substantially planar bottom surface thereof, and an input/output (I/O) connector positioned on a back plane thereof with a pair of positioning apertures provided on opposite sides thereof.

United States Patent Application Publication No. 2011/0261509 ('509 Publication), authored by Xu et al., discloses a Docking Cradle with Floating Connector Assembly. The '509 Publication describes a docking cradle for a portable electronic device that includes a floating connector assembly. The floating connector assembly isolates a portable electronic device connected to the connector assembly from at least some of the shock, vibration or other motion imposed on the rest of the docking cradle.

The connector assembly is positioned above a base frame and comprises a platform, a device interface on the platform, a device securing mechanism connected to the platform and connectable to the portable electronic device to physically secure the portable electronic device to the connector assembly; and at least one connector assembly spring connecting the connector assembly to the base frame such that the connector assembly is movable laterally relative to the base frame.

United States Patent Application Publication No. 2012/0075789 ('789 Publication), authored by DeCamp et al., discloses a Swiveling Base for a Portable Computing Device. The '789 Publication describes certain swiveling bases for portable computing devices. A swiveling base according to the '789 Publication includes a base member and a rotatable member. The base member can be placed on a flat surface and rotatably supports the rotatable member. The rotatable member releasably secures the portable computing device and can rotate relative to the base member to reorient a display of the portable computing device.

The swiveling bases may further include a control component disposed on the base member. The control component is disposed on the base member and facilitates user interaction with a computing application being executed on the portable computing device. The control component may be, for example, a button, a joystick, a D-pad, a tactile sensor pad, a touch-sensitive D-pad, a spherical trackball, a slider, or a sliding disk.

From a review of the foregoing citations in particular, and from a consideration of the prior art in general, it will be seen that the prior art thus perceives a need for a cradle apparatus usable in combination with a case or cover construction for enabling a user to removably receive an electronic device as exemplified by a tablet type computer and rotatably and linearly displace the cradle apparatus relative to select surfacing of the case or cover construction to which the cradle apparatus is attached as summarized in more detail hereinafter.

SUMMARY OF THE INVENTION

Among the many objectives of this invention is the provision of an apparatus for encasing and selectively displaying an electronic device such as a notebook, laptop, or tablet type computer or similar device. These and other readily identifiable objectives of the invention (which other objectives become clear by consideration of the specification, claims and drawings as a whole) are met by providing a combination cradle-cassette apparatus for an electronic device that cooperates with an electronic device for selectively displaying the same.

To achieve these and other readily identifiable objectives, the present invention provides a cradle-cassette combination or apparatus for encasing and selectively displaying an electronic device. The cradle-cassette combination or apparatus according to the present invention preferably comprises a cradle construction, and a cassette construction. The cradle construction is preferably sized and shaped to removably receive or cradle the electronic device, and the cassette construction is preferably sized and shaped to translatably receive the cradle construction.

The cradle construction preferably comprises or includes an anterior cradle section or side; anterior cradle surfacing; a posterior cradle section or side; posterior cradle surfacing; a superior cradle section, end or side; an inferior cradle section, end, or side; and laterally opposed lateral cradle sections, ends, or sides. The lateral cradle sections each preferably comprise certain hinge-axis enabling posts adjacent the superior cradle section, which hinge axis-enabling posts extend laterally and are coaxial for defining a hinge axis of rotation.

The cassette construction preferably comprises or includes an anterior cassette section or side; anterior cassette surfacing; a posterior cassette section or side; posterior cassette surfacing; a superior cassette section or end; an inferior cassette section or end; and laterally opposed lateral cassette sections or sides. The lateral cassette sections or sides each preferably comprise a primary groove-defining flange. The primary groove-defining flanges extend medially for defining laterally opposed posterior grooves and laterally opposed anterior grooves.

The laterally-extending hinge axis-enabling posts are medially-received in the laterally-opposed cassette sections and translatable intermediate the superior cassette end and the inferior cassette end within the anterior grooves in anterior adjacency to the primary groove-defining flanges. The cradle construction is thus displaceable relative to the cassette construction for placing said cradle-cassette combination in either a cradle-closed configuration or position for cassette-enclosing the electronic device within the combination; or a cradle-opened or cradle-exposed configuration or position for cassette-exposing the electronic device via the combination and for selectively displaying said electronic device.

The cradle construction is preferably rotatable via the hinge axis-enabling posts and the axis of rotation defined thereby when said posts are translatably positioned at the inferior cassette section and the inferior cradle section is generally free of the cassette construction in a cradle-extended position or configuration. The cradle construction is positionable intermediate the cradle-exposed configuration or position and the cradle-closed configuration or position by way of the rotation enabled by the posts and their axis.

In other words, the cradle construction is translatable relative to the cassette construction so as to place the combination apparatus in either the cradle-closed or cradle-exposed configuration or position. The cradle construction may be translatably displaced in a direction orthogonal to the anterior and posterior directions for placing the hinge axis-enabling posts adjacent the inferior cassette section or end. Once the posts arrive at the inferior cassette section or end, the inferior cradle section or end is free from the cassette construction and the cradle construction is free to rotate about the axis of rotation defined by the posts so as to place the combination apparatus into the cradle-exposed configuration.

The cradle-cassette combination apparatus may further comprise certain post-stop structures or post-stopping termini formed at the junction of the inferior cassette section or end and the anterior grooves for preventing movement of the hinge axis-enabling posts therepast. Further, the cradle construction preferably comprises laterally-opposed, laterally extending cradle flanges at the anterior cradle section and the lateral cradle sections. Each lateral cassette section preferably comprises a secondary, medially-extending groove-defining flange.

The secondary groove-defining flanges basically function, in part, to space the cradle construction from anterior cassette surfacing of the posterior cassette section when in the cradle-closed configuration. The anterior flange surfacing is preferably outfitted with certain spacer means for preventing the cradle flanges from contacting the secondary groove-defining flanges when in the cradle-closed position. The spacer means may be preferably exemplified by periodically spaced protrusions (anteriorly extending relative to the secondary, groove-defining flanges) intermediate the superior cassette section or end and the inferior cassette section or end.

The lateral cassette sections may each further preferably comprise a tertiary guide flange, which tertiary guide flanges extend medially in anterior parallel adjacency to secondary, groove-defining flanges for guiding the cradle flanges when the same are undergoing translatable displacement within the posterior grooves in anterior adjacency to the described spacer means as exemplified by the protrusions extending anteriorly from the anterior surfacing.

The anterior cassette section or side preferably comprises laterally opposed flange seats formed at the lateral cassette sections at the anterior cassette surfacing thereof. The cradle flanges are preferably receivable and/or seatable upon the flange seats when the cradle-cassette combination apparatus is positioned in the cradle-supported or cradle-exposed configuration or position. The cradle flanges are structurally located within the posterior grooves when in the cradle-closed configuration or position and the spacer means prevent the flanges from contacting the secondary groove-defining flanges.

Other objects of the present invention, as well as particular features, elements, and advantages thereof, will be elucidated or become apparent from, the following description and the accompanying drawing figures.

BRIEF DESCRIPTION OF THE DRAWINGS

Other features and objectives of my invention will become more evident from a consideration of the following brief description of patent drawings:

FIG. 7 is a first cradle end view of the first alternative cradle-cassette combination or apparatus according to the present invention in the cradle-extended configuration.

FIG. 8 is a second plan view of the first alternative cradle-cassette combination or apparatus according to the present invention in the cradle-extended configuration, the second plan view being opposite the first plan view otherwise depicted in FIG. 6.

FIG. 9 is a first perspective view of the first alternative cradle-cassette combination or apparatus according to the present invention in the cradle-extended configuration and facing the first direction.

FIG. 10 is a second perspective view of the first alternative cradle-cassette combination or apparatus according to the present invention in the cradle-extended configuration, the second perspective view being opposite the first perspective view otherwise depicted in FIG. 9.

FIG. 10A is an enlarged fragmentary perspective depiction of a cradle-to-cassette junction site as enlarged from FIG. 10.

FIG. 13 is a posterior plan view of the first alternative cradle-cassette combination or apparatus according to the present invention in the cradle-exposed configuration.

FIG. 14 is a second lateral view of the first alternative cradle-cassette combination or apparatus according to the present invention in the cradle-exposed configuration.

FIG. 14A is an enlarged fragmentary upper end view of the structures otherwise depicted in FIG. 14, with certain parts otherwise hidden from view being shown in broken lines for greater clarity.

FIG. 15 is a first end view of the first alternative cradle-cassette combination or apparatus according to the present invention in the cradle-exposed configuration.

FIG. 15A is an enlarged fragmentary right side view of the structures otherwise depicted in FIG. 15, the enlarged view being presented for greater clarity.

FIG. 22 is a perspective view of the first alternative cradle-cassette combination or apparatus according to the present invention depicting the apparatus in a third state of cradle construction rotation relative to the cassette construction, the third state of cradle construction rotation showing the cradle construction rotated a third rotational degree relative to the cassette construction for enabling a lateral cradle-cassette section or laterally-based stand position.

FIG. 23 is a perspective view of the first alternative cradle-cassette combination or apparatus according to the present invention depicting the apparatus in a fourth state of cradle construction rotation relative to the cassette construction, the fourth state of cradle construction rotation showing the cradle construction rotated a fourth rotational degree relative to the cassette construction for enabling an inferior cradle-superior cassette section or end-based stand position.

FIG. 26 is a superior section or first end view of a first alternative cradle construction according to the present invention.

FIG. 26A is an enlarged fragmentary view of the rightmost structures otherwise depicted in FIG. 26, the enlarged view being presented for greater clarity.

FIG. 27 is a frontal or anterior plan view of the first alternative cradle construction according to the present invention.

FIG. 28 is an inferior section or second end view of the first alternative cradle construction according to the present invention.

FIG. 28A is an enlarged fragmentary view of the rightmost structures otherwise depicted in FIG. 28, the enlarged view being presented for greater clarity.

FIG. 41 is an inferior section or second end view of the first alternative cassette construction according to the present invention.

FIG. 41A is an enlarged fragmentary view of the leftmost structures otherwise depicted in FIG. 41, the enlarged view being presented for greater clarity.

FIG. 41B is an enlarged first sectional view of the rightmost lateral cassette section as sectioned from FIG. 41, the sectional view being presented for greater clarity.

FIG. 41C is an enlarged second sectional view of the rightmost lateral cassette section as sectioned from FIG. 41, the sectional view being presented for greater clarity.

FIG. 49 is a first sequential perspective depiction of a second alternative cradle-cassette combination or apparatus according to the present invention showing said cradle-cassette combination or apparatus in a cradle-closed configuration and facing a first direction.

FIG. 50 is a second sequential perspective depiction of the second alternative cradle-cassette combination or apparatus according to the present invention in a first state of cradle construction extension from the cassette construction, the first state of cradle construction extension showing the cradle construction partially extended from the cassette construction.

FIG. 51 is a third sequential perspective depiction of the second alternative cradle-cassette combination or apparatus according to the present invention in the fully cradle-extended configuration.

FIG. 52 is a fourth sequential perspective depiction of the second alternative cradle-cassette combination or apparatus according to the present invention in a first state of cradle construction rotation relative to the cassette construction, the first state of cradle construction rotation showing the cradle construction rotated a first rotational degree relative to the cassette construction.

FIG. 53 is a fifth sequential perspective depiction of the second alternative cradle-cassette combination or apparatus according to the present invention in a second state of cradle construction rotation relative to the cassette construction, the second state of cradle construction rotation showing the cradle construction rotated a second rotational degree relative to the cassette construction.

FIG. 54 is a sixth sequential perspective depiction of the second alternative cradle-cassette combination or apparatus according to the present invention in the fully cradle-exposed configuration.

DETAILED DESCRIPTION OF THE PREFERRED EMBODIMENTS

Figure 1:
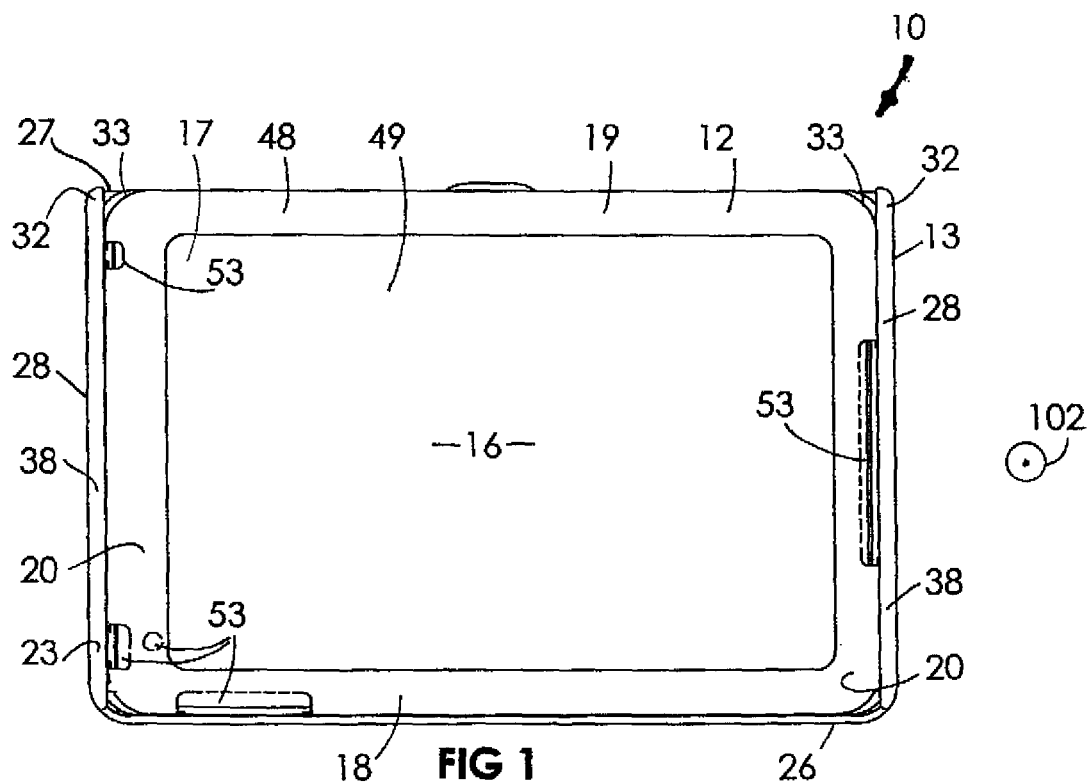
FIG. 1 is a first plan view of a first alternative cradle-cassette combination or apparatus according to the present invention in a cradle-closed configuration and facing a first direction.
Figure 2:
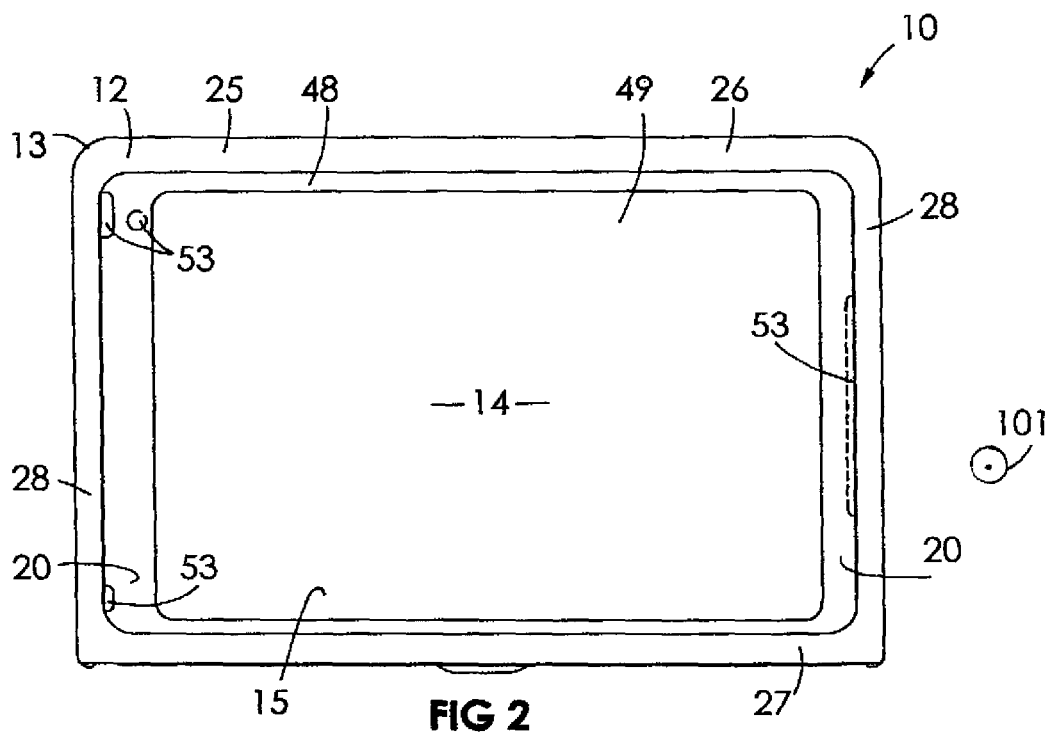
FIG. 2 is a second plan view of the first alternative cradle-cassette combination or apparatus according to the present invention in the cradle-closed configuration, the second plan view being opposite the first plan view otherwise depicted in FIG. 1.
Figure 3:
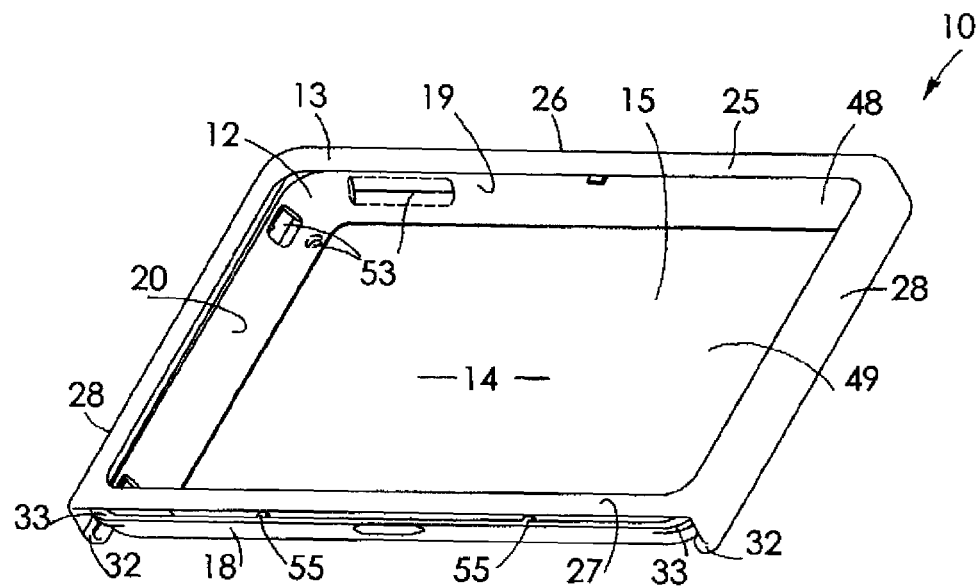
FIG. 3 is a first perspective view of the first alternative cradle-cassette combination or apparatus according to the present invention in a cradle-closed configuration and facing the first direction.

Referring now to the drawings with more specificity, the present invention preferably provides a cradle-cassette combination or apparatus as at 10 for encasing and selectively displaying an electronic device as at 11. The cradle-cassette combination or apparatus 10 according to the present invention preferably comprises a cradle construction as at 12 and a cassette construction as at 13. As will be seen from a comparative inspection of the drawings submitted in support of these specifications, the cradle construction 12 is preferably sized and shaped to removably receive or cradle the electronic device generically depicted at 11, and the cassette construction 13 is preferably sized and shaped to translatably receive the cradle construction 12.

The cradle construction 12 preferably comprises or includes an anterior cradle section or side as at 14; anterior cradle surfacing as at 15; a posterior cradle section or side as at 16; posterior cradle surfacing as at 17; a superior cradle section, end or side as at 18; an inferior cradle section, end, or side as at 19; and laterally opposed lateral cradle sections, ends, or sides as at 20. The lateral cradle sections 20 each preferably comprise certain hinge-axis enabling means as exemplified by hinge axis-enabling posts 21 adjacent the superior cradle section 18, which hinge axis-enabling posts 21 extend laterally and are coaxial for defining a hinge axis of rotation as at 100.

As indicated, the cassette construction 13 is preferably sized and shaped to translatably receive the cradle construction 12 as is generally depicted throughout the drawings submitted in support of these specifications. The cassette construction 13 preferably comprises an anterior cassette section or side as at 22; anterior cassette surfacing as at 23; a posterior cassette section or side as at 24; posterior cassette surfacing as at 25; a superior cassette section or end as at 26; an inferior cassette section or end as at 27; and laterally opposed lateral cassette sections or sides as at 28. The lateral cassette sections or sides 28 each preferably comprise a primary groove-defining flange as at 29. The primary groove-defining flanges 29 extend medially for defining laterally opposed posterior grooves as at 30 and laterally opposed anterior grooves as at 31.

The laterally-extending hinge axis-enabling posts 21 are medially-received in the laterally-opposed cassette sections 28 and translatable intermediate the superior cassette end 26 and the inferior cassette end 27 within the anterior grooves 31 in anterior adjacency to the primary groove-defining flanges 29. The cradle construction 12 is thus displaceable relative to the cassette construction 13 for placing said cradle-cassette combination 10 in either (a) a cradle-closed configuration or position (for cassette-enclosing the electronic device 11 within the combination 10) as generally depicted in FIGS. 1-4, 16, and 49; or (b) a cradle-opened or cradle-exposed configuration or position (for cassette-exposing the electronic device 11 via the combination 10 and for selectively displaying said device 11) as generally depicted in FIGS. 11, 12, 13, 14, 15, 21, and 54.

The cradle construction 12 is preferably rotatable via the hinge axis-enabling posts 21 and the axis of rotation 100 when said posts 21 are translatably positioned at the inferior cassette section or end 27 and the inferior cradle section 19 is generally free of the cassette construction 13 in a fully cradle-extended position or configuration as generally depicted in FIGS. 6, 8, 9, 10, 18, and 51. The cradle construction 12 is positionable intermediate the cradle-exposed configuration or position and the cradle-closed configuration or position by way of the rotation enabled by the posts 21 and axis 100. Referencing FIGS. 19, 20, 22, 23, 24, 25, 52, 53, 55, and 56, the reader will there see the cradle construction 12 may be positioned obliquely relative to the cassette construction 13 in any number of various angles by way of the rotation here described.

Referencing FIGS. 22-25, 55, and 56 in particular the reader will there see the cradle-cassette combination 10 in various intermediary positions between the cradle-closed configuration and cradle-exposed configuration for enabling the user to stand the combination upon either upon (1) the inferior cradle end 19 and the superior cassette end 26, or (2) a corresponding lateral cradle section 20 and lateral cassette section 28. In other words, the cradle construction 12 is preferably positionable obliquely relative to the cassette construction 13 intermediate the cradle-closed configuration and the cradle-exposed configuration.

Figures 24, 25:
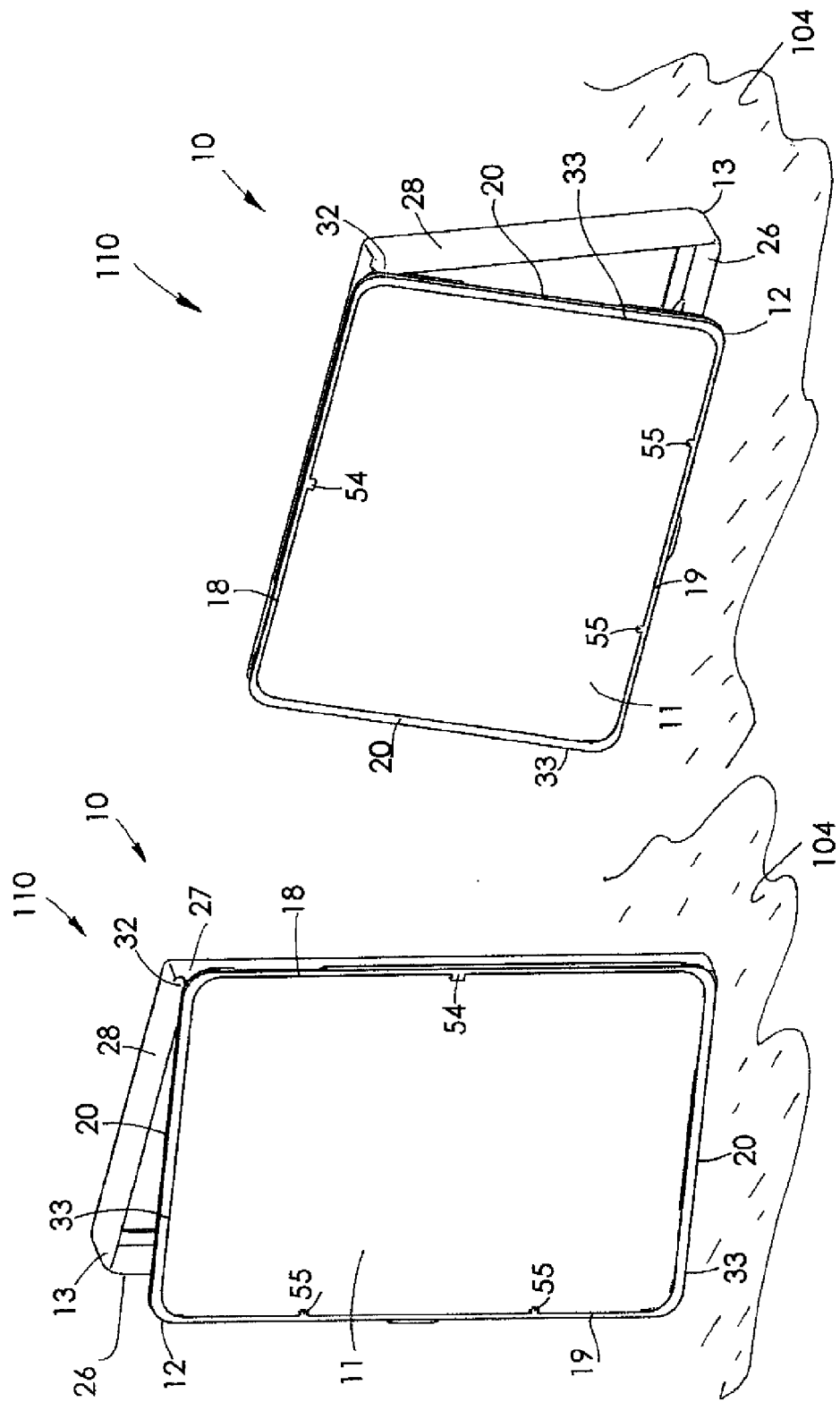
FIG. 24 is a perspective view of the first alternative cradle-cassette combination or apparatus according to the present invention depicting the apparatus encasing or cradling a generic electronic device in the third state of cradle construction rotation relative to the cassette construction for enabling the lateral cradle-cassette section or laterally-based stand position.
FIG. 25 is a perspective view of the first alternative cradle-cassette combination or apparatus according to the present invention depicting the apparatus encasing or cradling a generic electronic device in the fourth state of cradle construction rotation relative to the cassette construction for enabling an inferior cradle-superior cassette section or end-based stand position.
Figure 29:
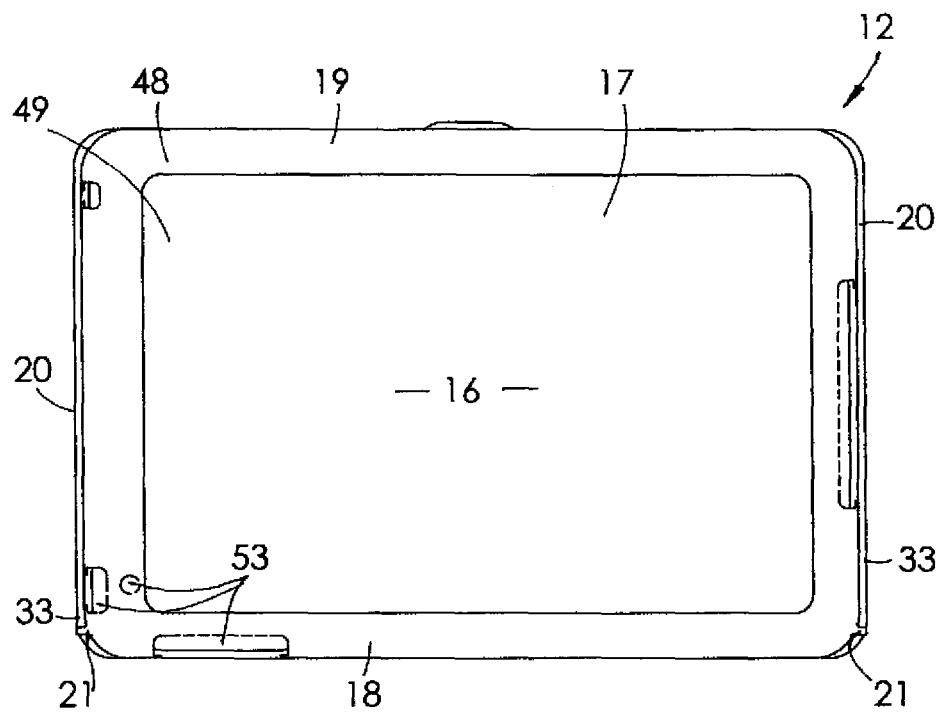
FIG. 29 is a first rear or posterior plan view of the first alternative cradle construction according to the present invention.
Figures 30, 31:
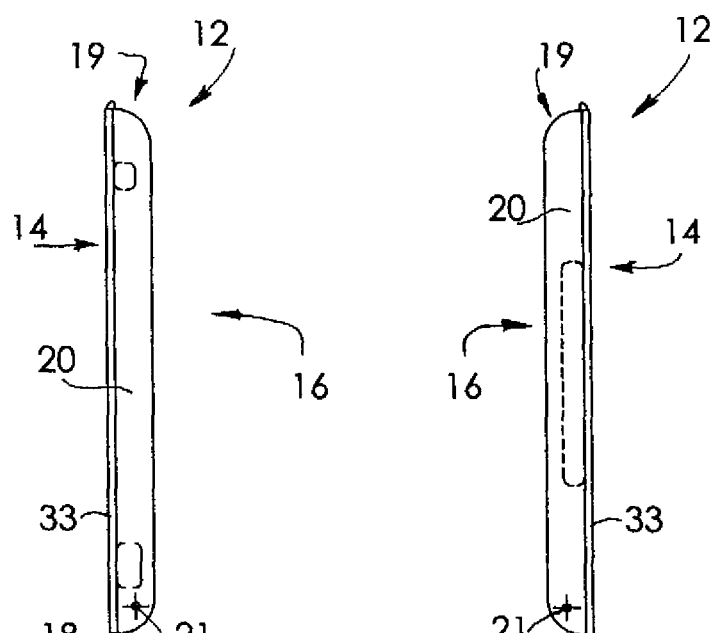
FIG. 30 is a first view of a first lateral end of the first alternative cradle construction according to the present invention.
FIG. 31 is a first view of a second lateral end of the first alternative cradle construction according to the present invention.
Figure 32:
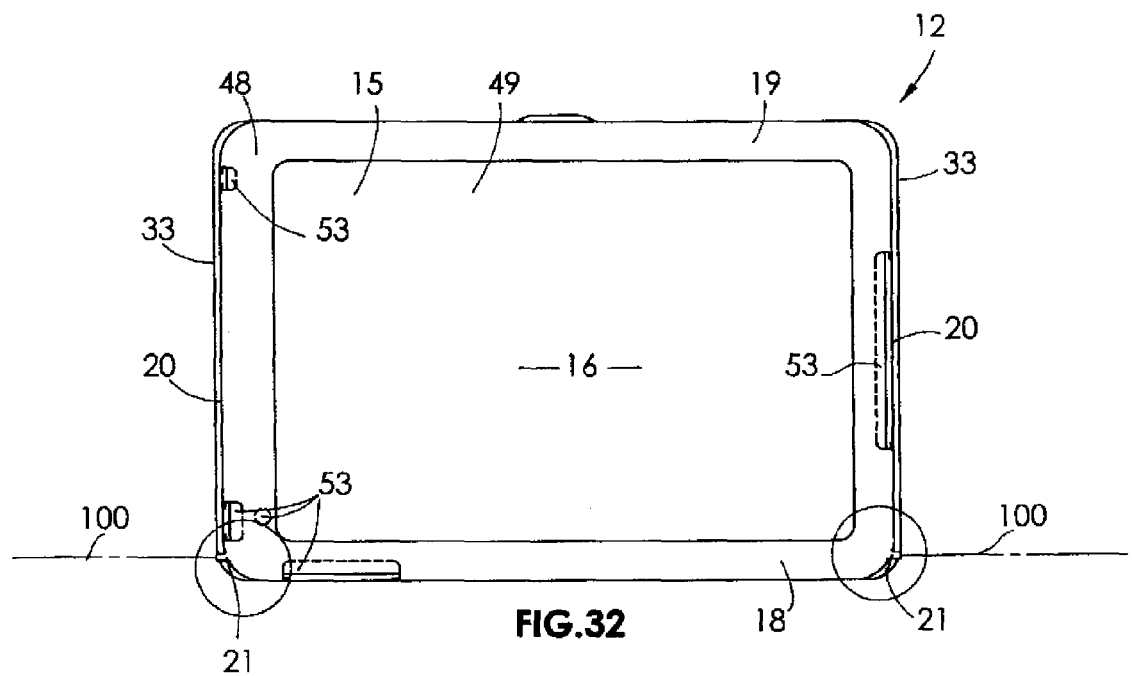
FIG. 32 is a second rear or posterior plan view of the first alternative cradle construction according to the present invention.
Figure 33:
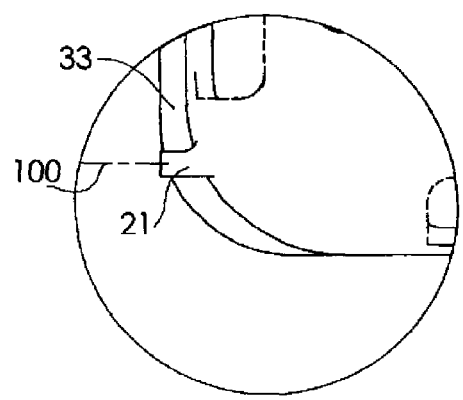
FIG. 33 is an enlarged fragmentary view of the lower left end of the structures otherwise depicted in FIG. 32, the enlarged view being presented for greater clarity.
Figure 34:
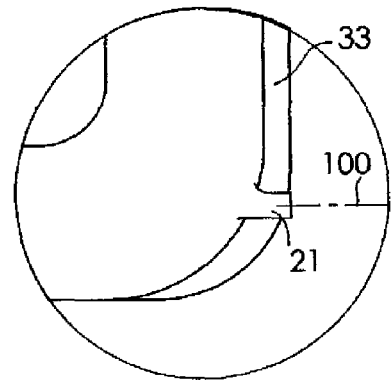
FIG. 34 is an enlarged fragmentary view of the lower right end of the structures otherwise depicted in FIG. 32, the enlarged view being presented for greater clarity.
Figure 35:
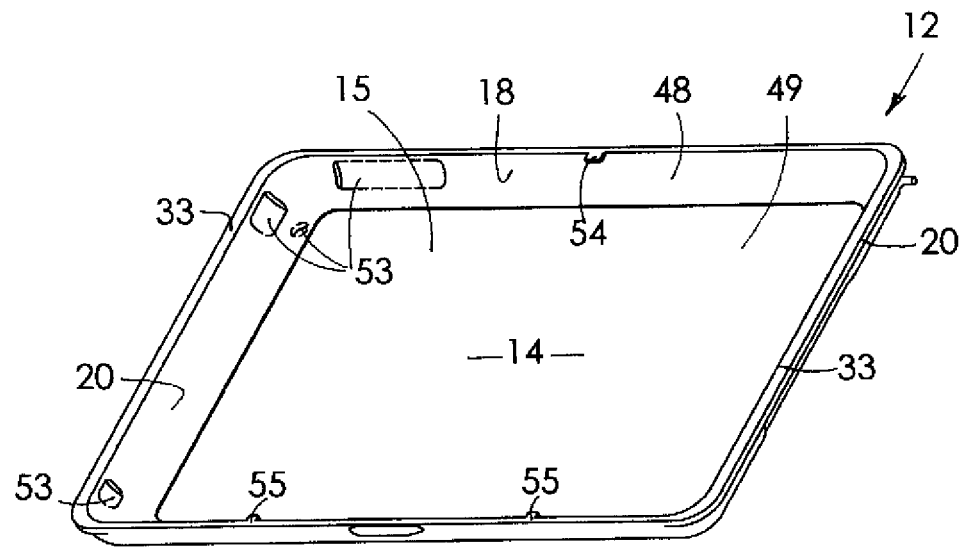
FIG. 35 is an anterior perspective view of the first alternative cradle construction according to the present invention.
Figure 36:
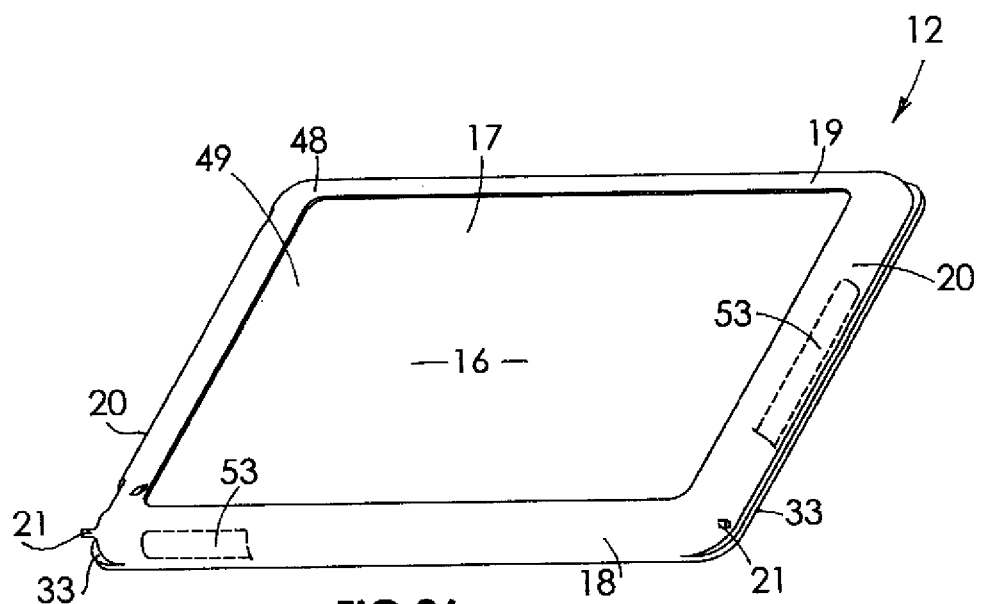
FIG. 36 is a posterior perspective view of the first alternative cradle construction according to the present invention.
Figure 37:
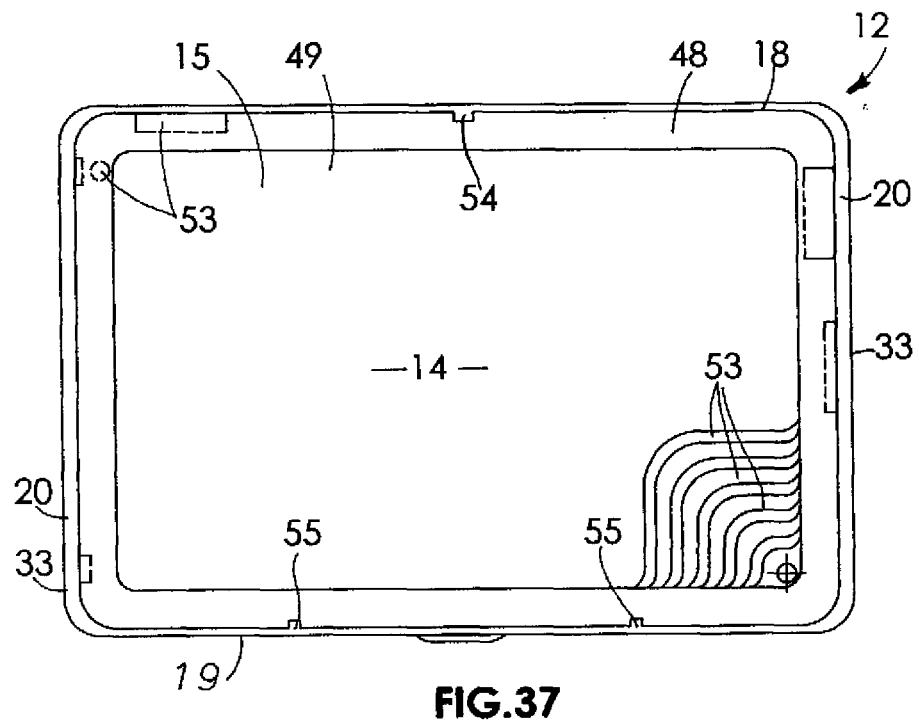
FIG. 37 is a frontal or anterior plan view of a second alternative cradle construction according to the present invention.
Figure 38:
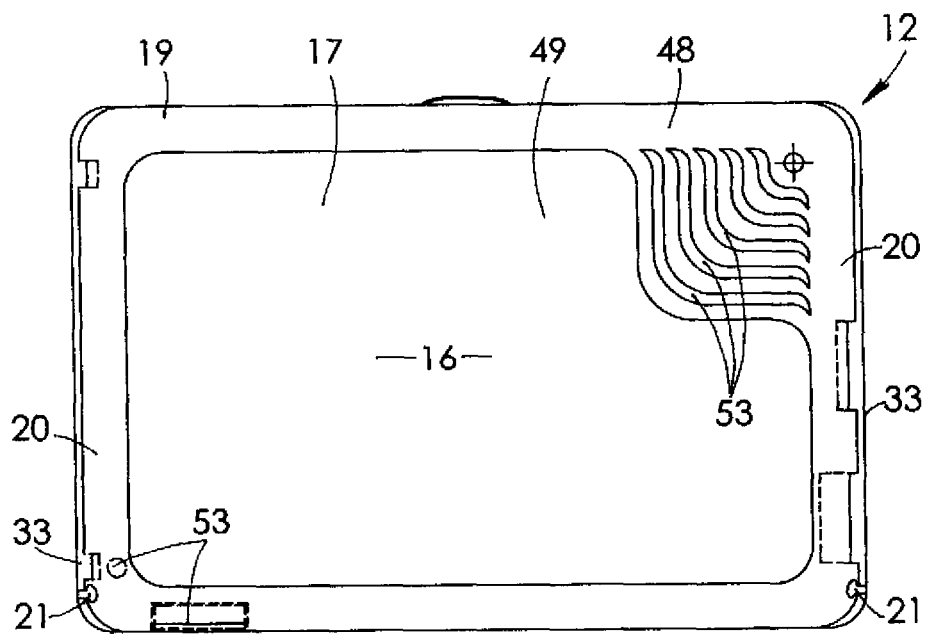
FIG. 38 is a rear or posterior plan view of the second alternative cradle construction according to the present invention.
Figure 39:
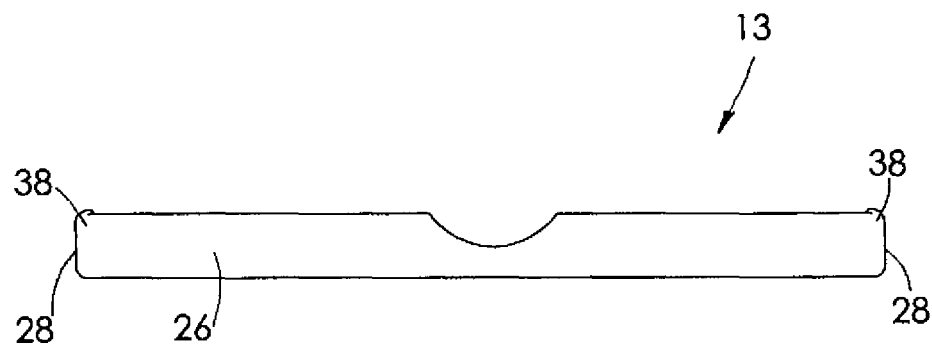
FIG. 39 is a superior section or first end view of a first alternative cassette construction according to the present invention.
Figure 56:
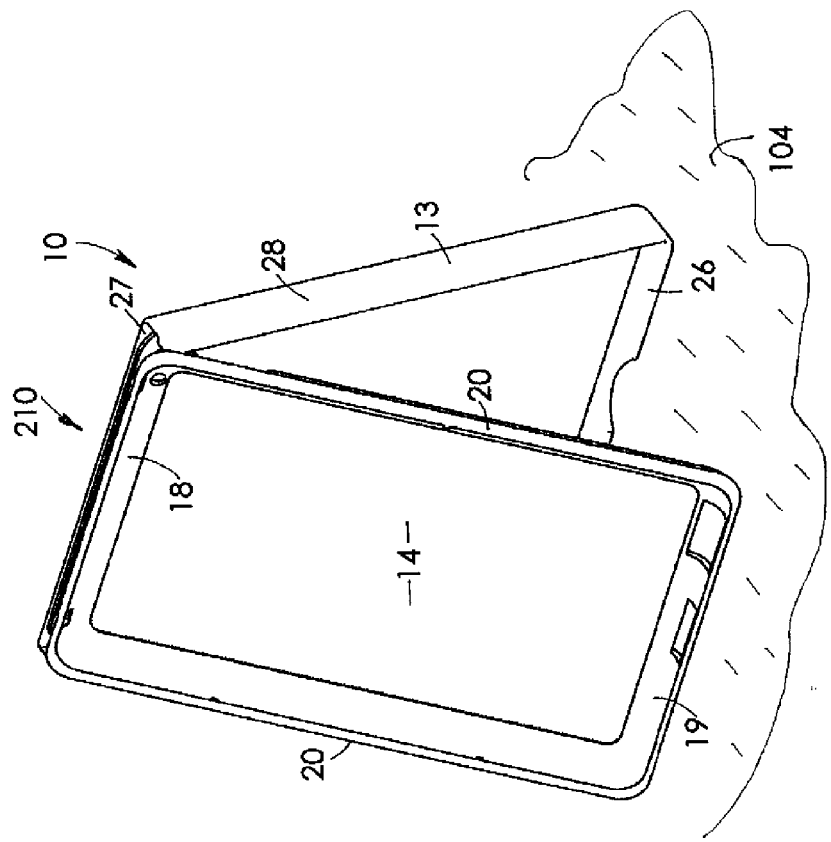
FIG. 56 is a perspective view of the second alternative cradle-cassette combination or apparatus according to the present invention depicting the apparatus in a fourth state of cradle construction rotation relative to the cassette construction, the fourth state of cradle construction rotation showing the cradle construction rotated a fourth rotational degree relative to the cassette construction for enabling an inferior cradle-superior cassette section or end-based stand position.
Figure 55:
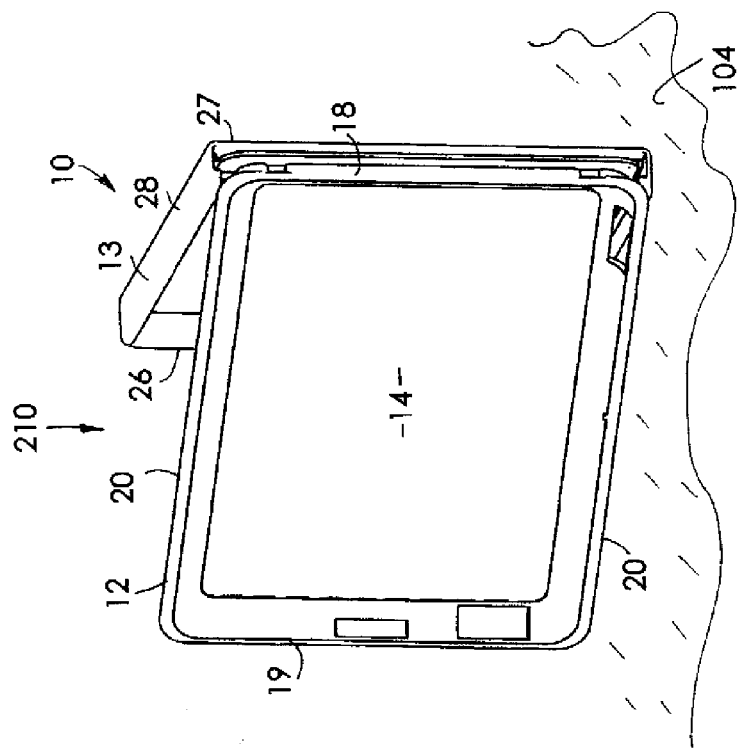
FIG. 55 is a perspective view of the second alternative cradle-cassette combination or apparatus according to the present invention depicting the apparatus in a third state of cradle construction rotation relative to the cassette construction, the third state of cradle construction rotation showing the cradle construction rotated a third rotational degree relative to the cassette construction for enabling a lateral cradle-cassette section or laterally-based stand position.
Figure 58:
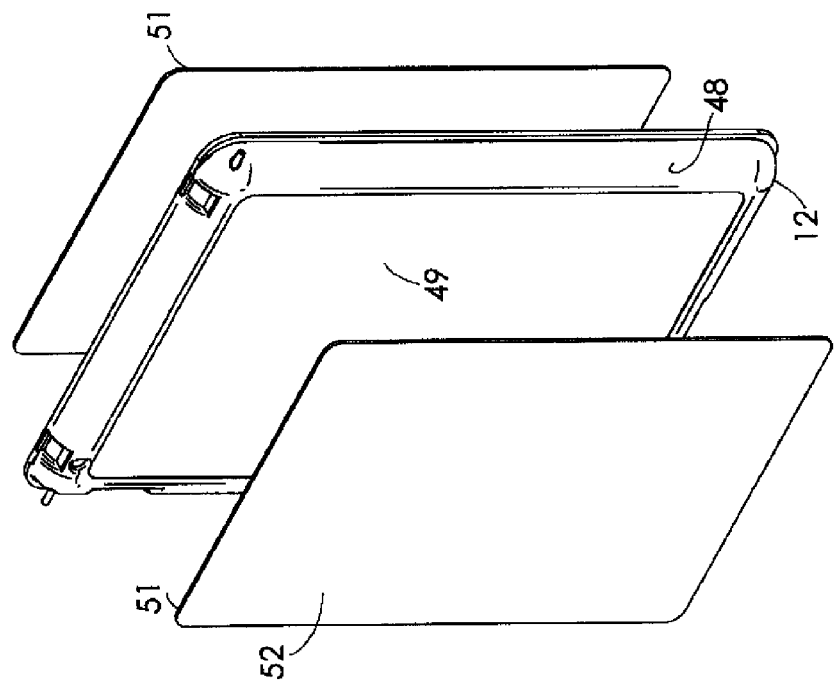
FIG. 58 is an exploded posterior perspective view showing the second alternative cradle construction according to the present invention intermediate opposed space-filling members.
Figure 57:
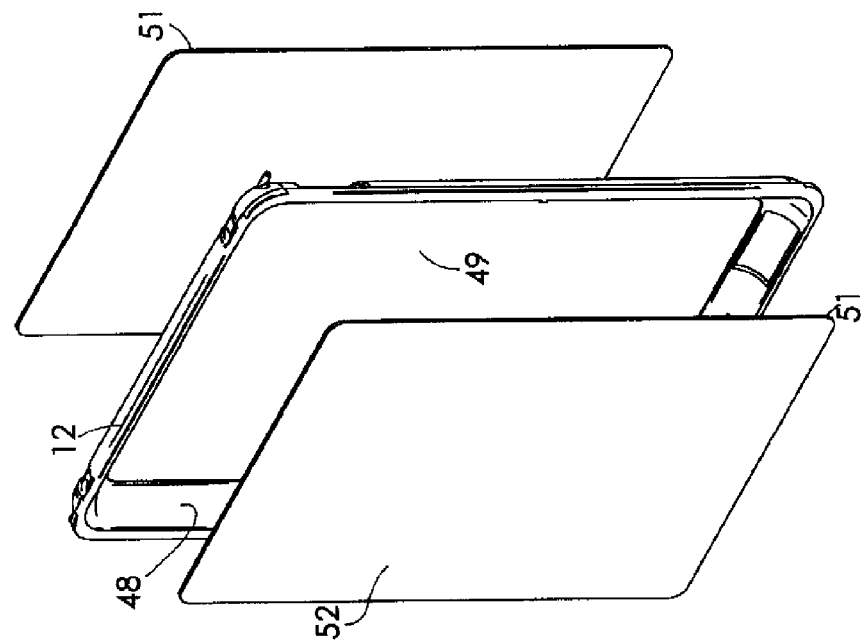
FIG. 57 is an exploded anterior perspective view showing the second alternative cradle construction according to the present invention intermediate opposed space-filling members.
Figure 59:
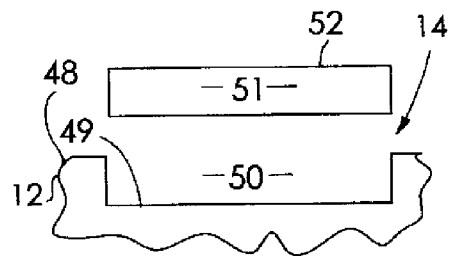
FIG. 59 is a fragmentary diagrammatic sectional exploded type view or depiction of anterior portions of a cradle construction according to the present invention to depict a member-receiving space or volume receiving a space-filling member.
Figure 60:
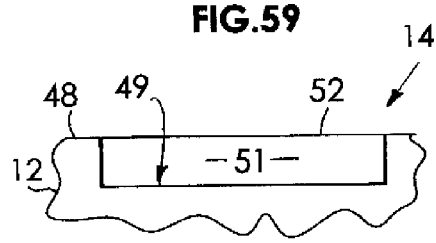
FIG. 60 is a fragmentary diagrammatic sectional assembled type view or depiction of anterior portions of a cradle construction according to the present invention depicting a member-receiving space or volume with a received space-filling member.
Figure 63:
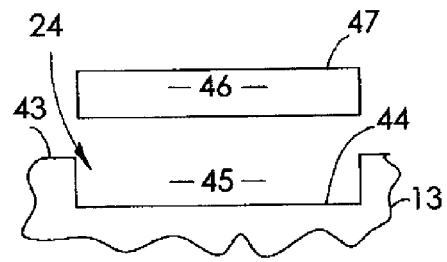
FIG. 63 is a fragmentary diagrammatic sectional exploded type view or depiction of posterior portions of a cassette construction according to the present invention to depict a member-receiving space or volume receiving a space-filling member.
Figure 61:
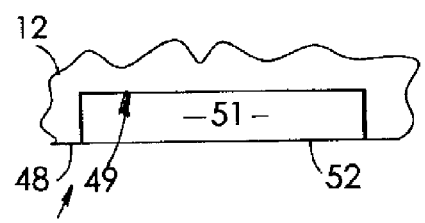
FIG. 61 is a fragmentary diagrammatic sectional assembled type view or depiction of posterior portions of a cradle construction according to the present invention to depict a member-receiving space or volume with a received space-filling member.
Figure 64:
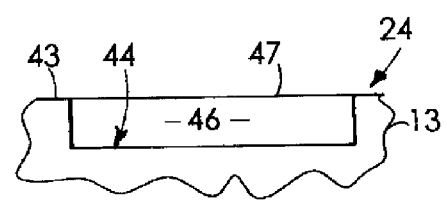
FIG. 64 is a fragmentary diagrammatic sectional assembled type view or depiction of anterior portions of a cassette construction according to the present invention depicting a member-receiving space or volume with a received space-filling member.
Figure 62:
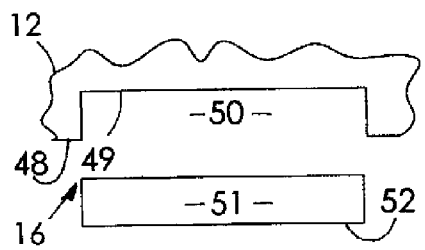
FIG. 62 is a fragmentary diagrammatic sectional exploded type view or depiction of anterior portions of a cradle construction according to the present invention depicting a member-receiving space or volume receiving a space-filling member.
Figure 66:
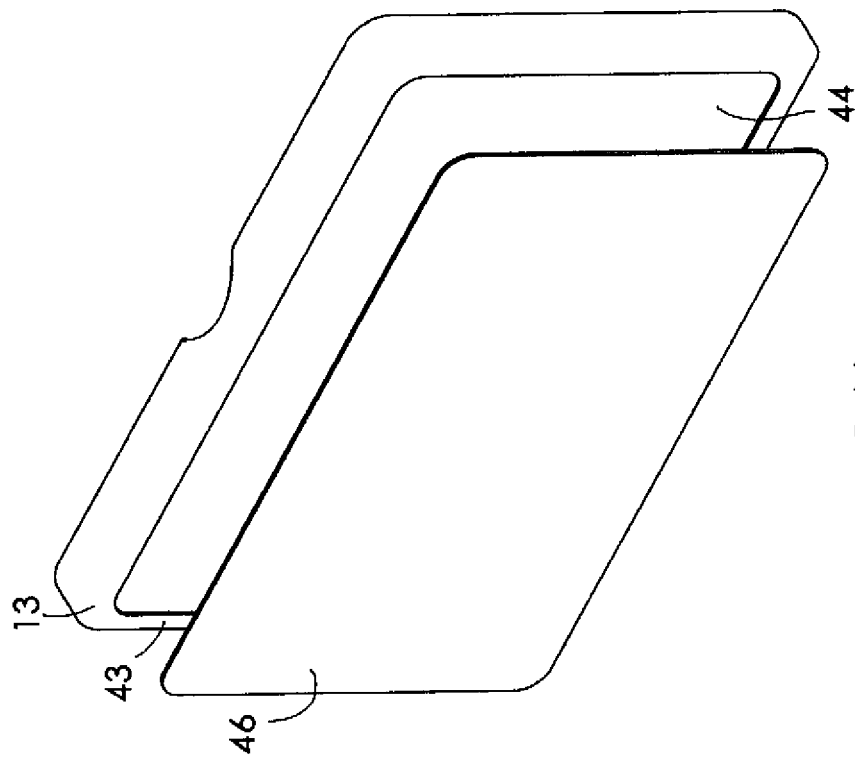
FIG. 66 is an exploded posterior perspective view showing the first alternative cassette construction according to the present invention juxtaposed in anterior adjacency to a space-filling member.
Figure 65:
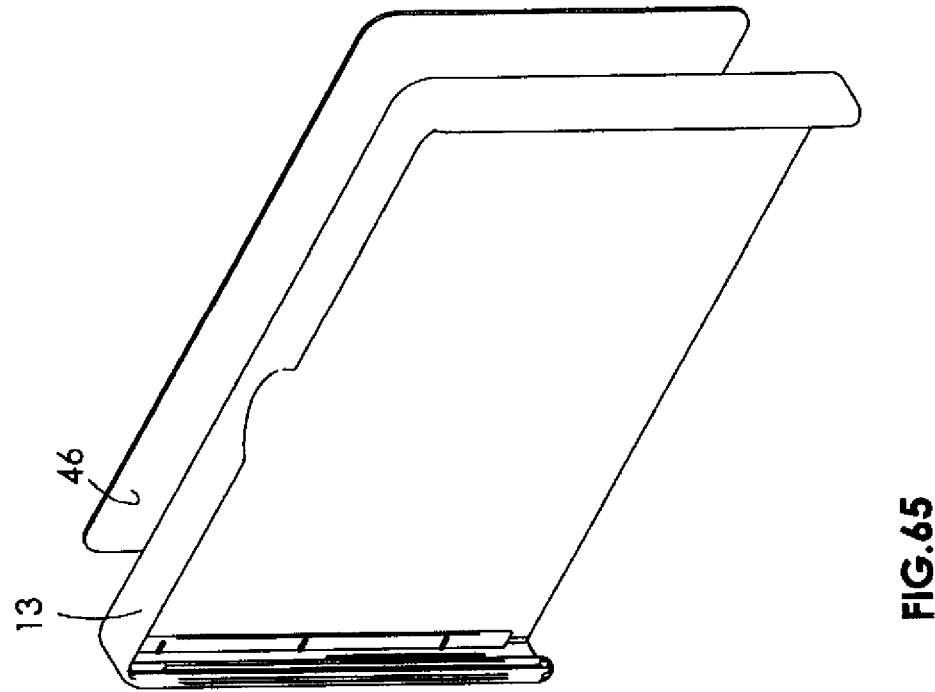
FIG. 65 is an exploded anterior perspective view showing the first alternative cassette construction according to the present invention juxtaposed in anterior adjacency to a space-filling member.

The obliquely positionable cradle and cassette constructions 12 and 13 enable a user to support the cradle-cassette combination 10 upon a support surface as at 104 in a select support position, which select support position is selected from the group consisting of an inferior cradle-superior cassette section or end-based stand position as generally depicted in FIGS. 23, 25, and 56; and a lateral cradle-cassette section or laterally-based stand position as generally depicted in FIGS. 22, 24, and 55.

Comparatively referencing FIGS. 22-25 versus FIGS. 55 and 56, the reader will note that the present invention contemplates both a first alternative landscape orientation type cradle-cassette combination as at 110, and a second alternative portrait orientation type cradle-cassette combination as at 210. In this regard, the reader will further note that the preferred overall transverse shape of the cradle-cassette combination 10 is rectangular to receive and display a rectangular electronic device 11. As is well known, rectangular constructions may be either oriented in a portrait type orientation or landscape type orientation.

The orientation of the cradle-cassette combination 10 may thus be described by the way in which the rectangular cradle-cassette combination 10 is oriented for normal viewing. The two most common types of rectangular orientation are portrait and landscape. The specific word definitions basically derive from (a) "portrait(s)" of personages that are often more fitting where the heights of the display areas are greater than the widths, and (b) "landscape(s)" describing artistic outdoor scenes where a relatively wider view area over height would be preferred since the vertical dimension would typically be minimized in favor of the landscape scenery.

The landscape orientation type cradle-cassette combination as at 110 shows an inferior cradle-cassette section stand position as generally depicted in FIGS. 23 and 25, and a lateral cradle-cassette section stand position as generally depicted in FIGS. 22 and 24. The portrait orientation type cradle-cassette combination as at 210 shows an inferior cradle-cassette section stand position as generally depicted in FIG. 56, and a lateral cradle-cassette section stand position as generally depicted in FIG. 55.

Figure 4:
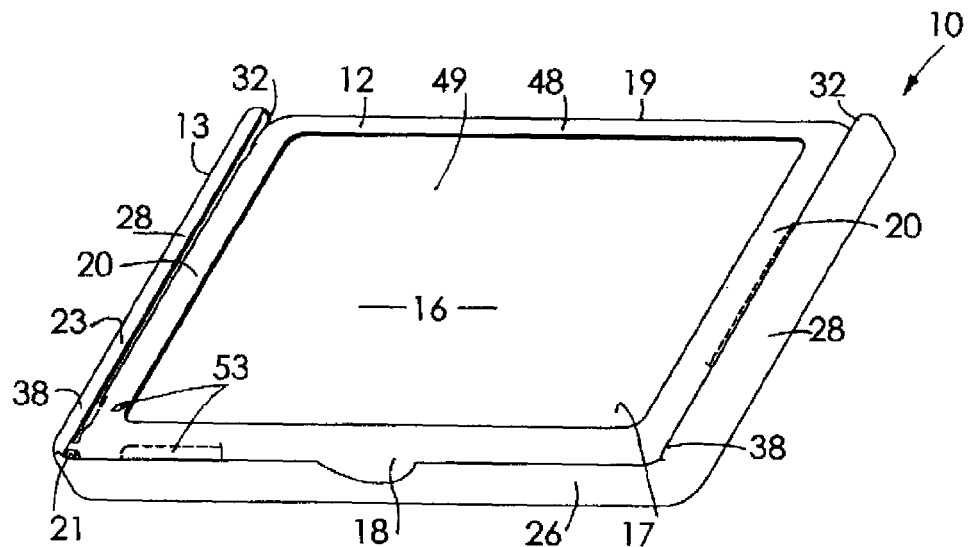
FIG. 4 is a second perspective view of the first alternative cradle-cassette combination or apparatus according to the present invention in a cradle-closed configuration, the second perspective view being opposite the first perspective view otherwise depicted in FIG. 3.
Figure 5:
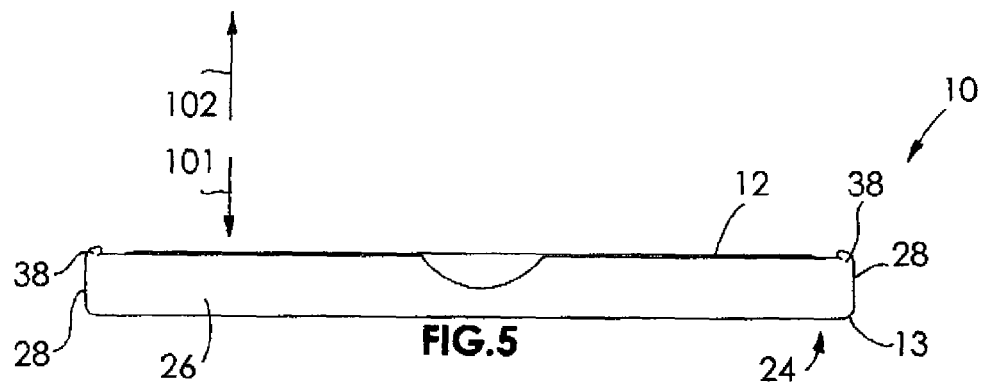
FIG. 5 is a first cassette end view of the first alternative cradle-cassette combination or apparatus according to the present invention in a cradle-extended configuration.
Figure 6:
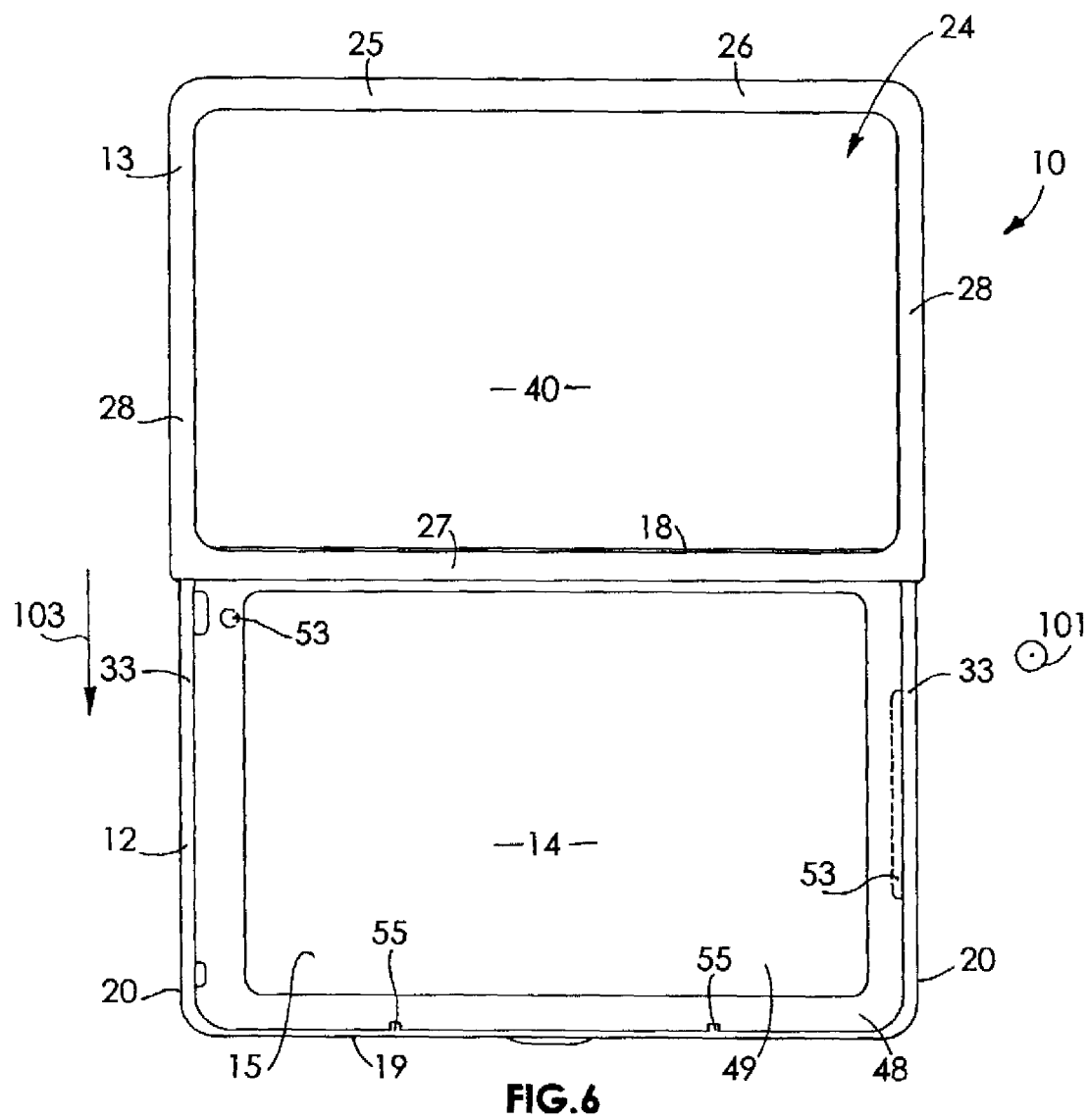
FIG. 6 is a first plan view of the first alternative cradle-cassette combination or apparatus according to the present invention in the cradle-extended configuration and facing a first direction.

Referencing FIGS. 2, 3, 16, and 49, the reader will there see that the anterior cradle surfacing 15 and posterior cassette surfacing 25 both face in a first case direction 101 (e.g. out of the page toward the reader in FIG. 2) when in the cradle-closed configuration or position. Stated another way, the posterior cradle surfacing 17 and anterior cassette surfacing 23 face in a second case direction 102 opposite to the first case direction 101 (e.g. into the page away from the reader in FIG. 2) as generally depicted in FIGS. 1 and 4.

Figure 11A:
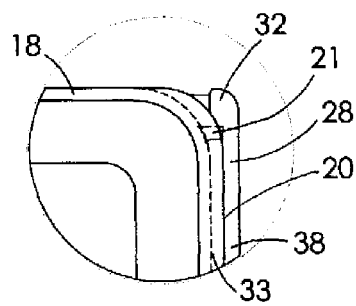
FIG. 11A is an enlarged fragmentary view of the upper right corner structures otherwise depicted in FIG. 11, enlarged for greater clarity.
Figure 11:
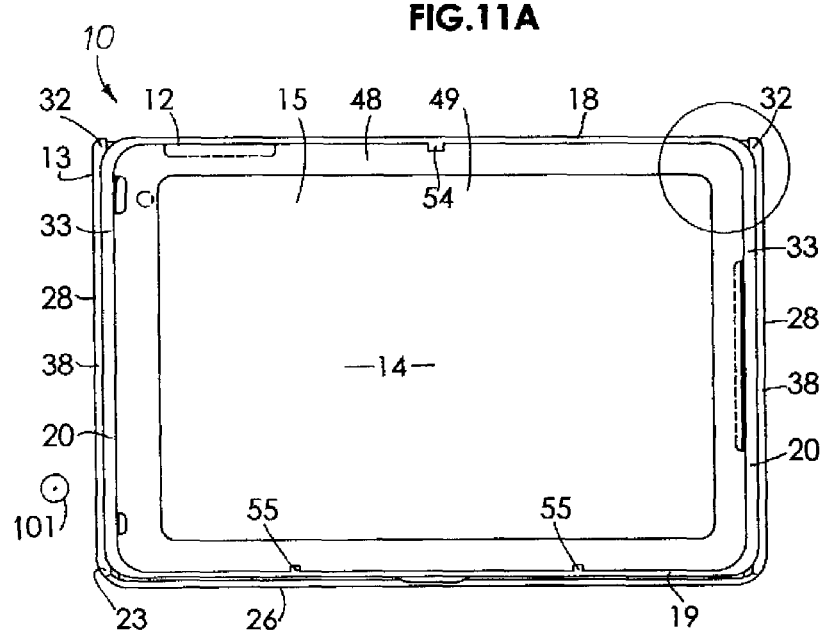
FIG. 11 is an anterior plan view of the first alternative cradle-cassette combination or apparatus according to the present invention in a cradle-exposed configuration.
Figure 12:
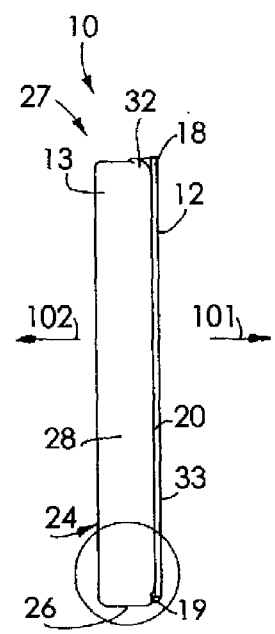
FIG. 12 is a first lateral view of the first alternative cradle-cassette combination or apparatus according to the present invention in the cradle-exposed configuration.
Figure 12A:
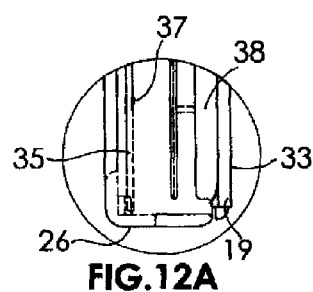
FIG. 12A is an enlarged fragmentary lower end view of the of the structures otherwise depicted in FIG. 12, with certain parts otherwise hidden from view being shown in broken lines for greater clarity.
Figure 17:
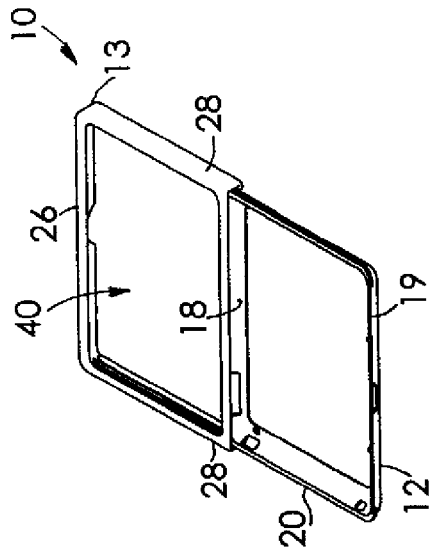
FIG. 17 is a second sequential perspective depiction of the first alternative cradle-cassette combination or apparatus according to the present invention in a first state of cradle construction extension from the cassette construction, the first state of cradle construction extension showing the cradle construction partially extended from the cassette construction.
Figure 18:
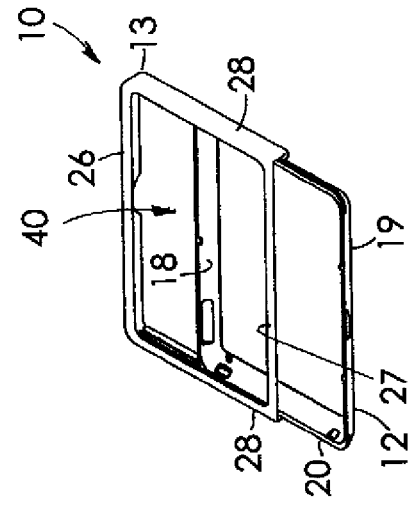
FIG. 18 is a third sequential perspective depiction of the structures otherwise depicted in FIG. 9 showing the first alternative cradle-cassette combination or apparatus according to the present invention in the fully cradle-extended configuration.
Figure 16:
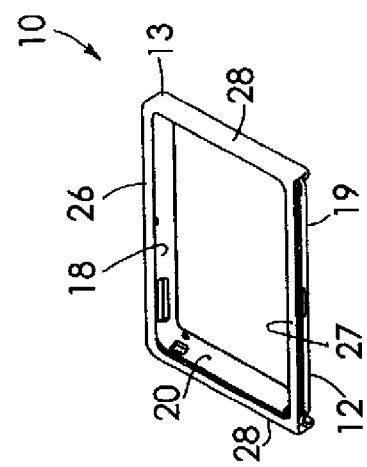
FIG. 16 is a first sequential perspective depiction of the structures otherwise depicted in FIG. 3 showing the first alternative cradle-cassette combination or apparatus according to the present invention in a cradle-closed configuration and facing the first direction.
Figure 21:
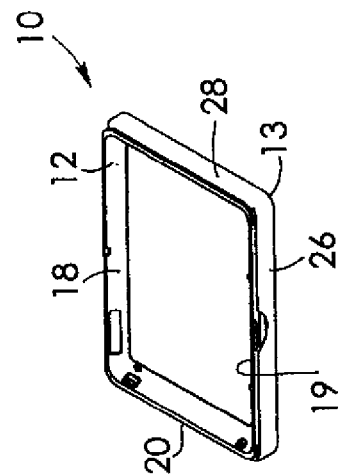
FIG. 21 is a sixth sequential perspective depiction of the first alternative cradle-cassette combination or apparatus according to the present invention in the fully cradle-exposed configuration.
Figure 20:
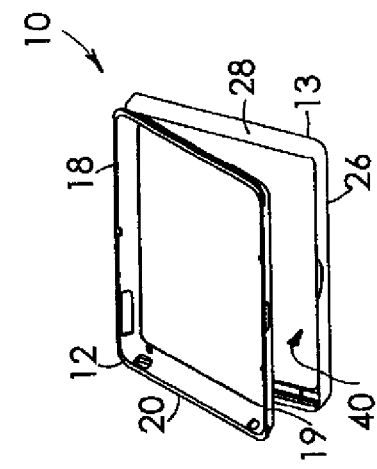
FIG. 20 is a fifth sequential perspective depiction of the first alternative cradle-cassette combination or apparatus according to the present invention in a second state of cradle construction rotation relative to the cassette construction, the second state of cradle construction rotation showing the cradle construction rotated a second rotational degree relative to the cassette construction.
Figure 19:
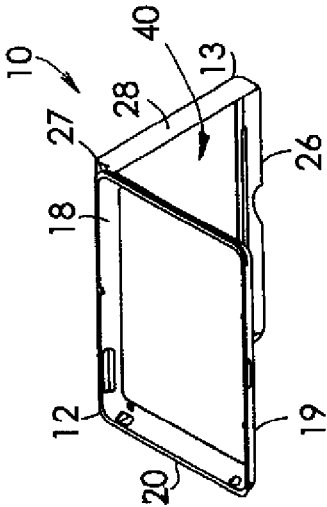
FIG. 19 is a fourth sequential perspective depiction of the first alternative cradle-cassette combination or apparatus according to the present invention in a first state of cradle construction rotation relative to the cassette construction, the first state of cradle construction rotation showing the cradle construction rotated a first rotational degree relative to the cassette construction.

The anterior cradle surfacing 15 and anterior cassette surfacing 23, by contrast, both face in the first case direction 101 when in the cradle-supported, cradle-exposed, or cradle-opened configuration or position as generally depicted in FIGS. 11 and 12; or the posterior cradle surfacing 17 and the posterior cassette surfacing 25 both face in the second case direction 102 when in the cradle-supported or cradle-exposed configuration or position as generally depicted in FIGS. 13, 14, and 15.

The cradle construction 12 is translatable relative to the cassette construction 13 so as to place the combination 10 in either the cradle-closed or cradle-exposed configuration or position. Comparatively referencing FIGS. 2 versus 6, or FIGS. 1 versus 8, the reader will see that the cradle construction 12 is translatably displaced in a third direction 103 orthogonal to the first and second directions 101 and 102 for placing the hinge axis-enabling posts 21 adjacent the inferior cassette section or end 27. Once the posts 21 arrive at the inferior cassette section or end 27, the inferior cradle section or end 19 is free from the cassette and the cradle construction is free to rotate about the axis 100 so as to place the combination 10 into the cradle-exposed configuration.

The cradle-cassette combination 10 further comprise certain post-stop structures or post-stopping termini as at 32 formed at the junction of the inferior cassette section or end 27 and the anterior grooves 30 for preventing movement of the hinge axis-enabling posts 21 therepast. Further, the cradle construction preferably comprises laterally-opposed, laterally extending cradle flanges as at 33 at the anterior cradle section 14 and the lateral cradle sections 20.

Further, each lateral cassette section 28 preferably comprises a secondary, medially-extending groove-defining flange as at 35. The secondary groove-defining flanges 35 preferably comprise anterior flange surfacing as at 36. The secondary groove-defining flanges 25 basically function, in part, to space the cradle construction 12 from anterior cassette surfacing of the posterior cassette section when in the cradle-closed configuration.

The anterior flange surfacing 36 is preferably outfitted with certain spacer means for preventing the cradle flanges 33 from contacting the secondary groove-defining flanges 35 when in the cradle-closed position. The spacer means may be preferably exemplified by periodically spaced protrusions 37 (anteriorly extending relative to the secondary, groove-defining flanges 35) intermediate the superior cassette section or end 26 and the inferior cassette section or end 27.

The lateral cassette sections 28 each further preferably comprise a tertiary guide flange as at 34, which tertiary guide flanges 34 extend medially in anterior parallel adjacency to secondary, groove-defining flanges 35 for guiding the cradle flanges 33 when the same are undergoing translatable displacement within the posterior grooves 31 in anterior adjacency to the described spacer means as exemplified by the protrusions 37 extending anteriorly from the anterior surfacing 36.

The anterior cassette section or side 22 preferably comprises laterally opposed flange seats as at 38, which flange seats 38 are formed at the lateral cassette sections 28 at the anterior cassette surfacing 23 thereof. The cradle flanges 33 are preferably receivable and/or seatable upon the flange seats 38 when the cradle-cassette combination 10 is in the cradle-supported or cradle-exposed configuration or position. The cradle flanges 33 are structurally located within the posterior grooves 31 when in the cradle-closed configuration or position and the spacer means prevent the flanges from contacting the secondary groove-defining flanges 35.

Figure 40:
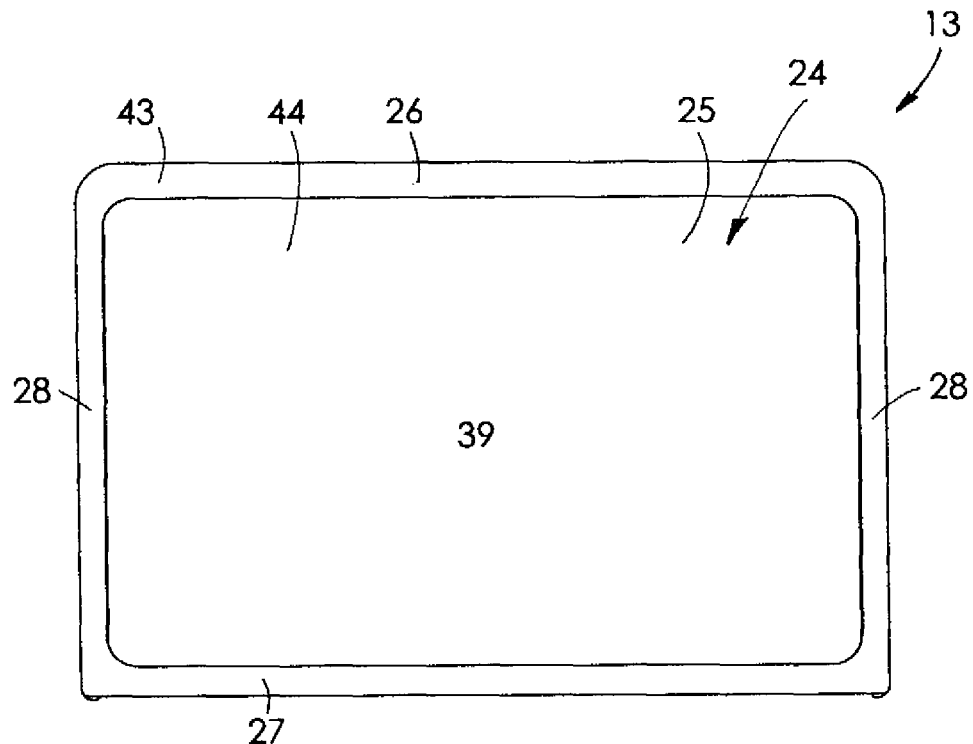
FIG. 40 is a rear or posterior plan view of the first alternative cassette construction according to the present invention.
Figure 42:
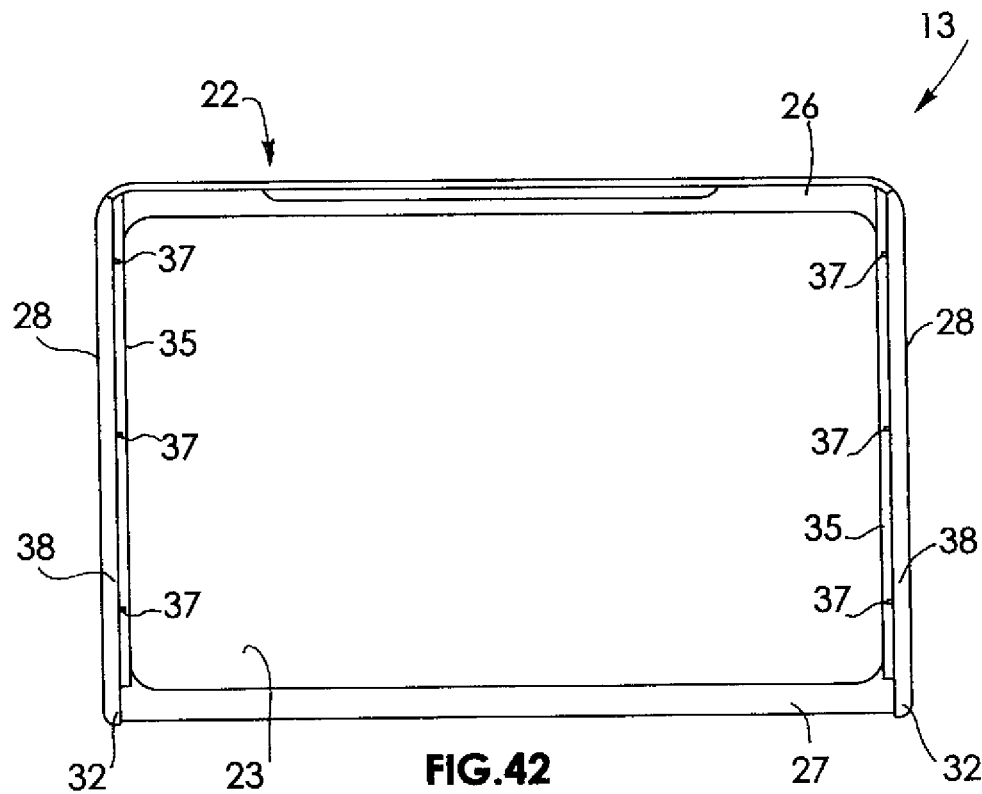
FIG. 42 is a frontal or anterior plan view of the first alternative cassette construction according to the present invention.
Figure 43:
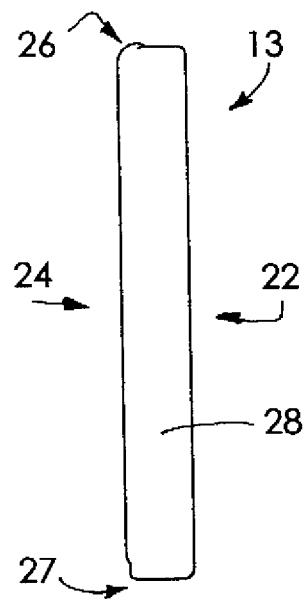
FIG. 43 is a first lateral end view of the first alternative cassette construction according to the present invention.
Figure 44:
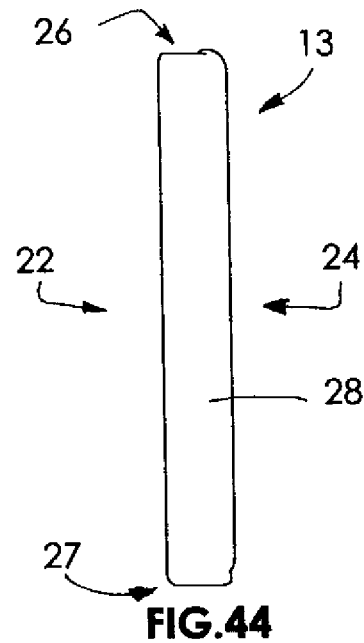
FIG. 44 is a second lateral end view of the first alternative cassette construction according to the present invention.
Figure 45:
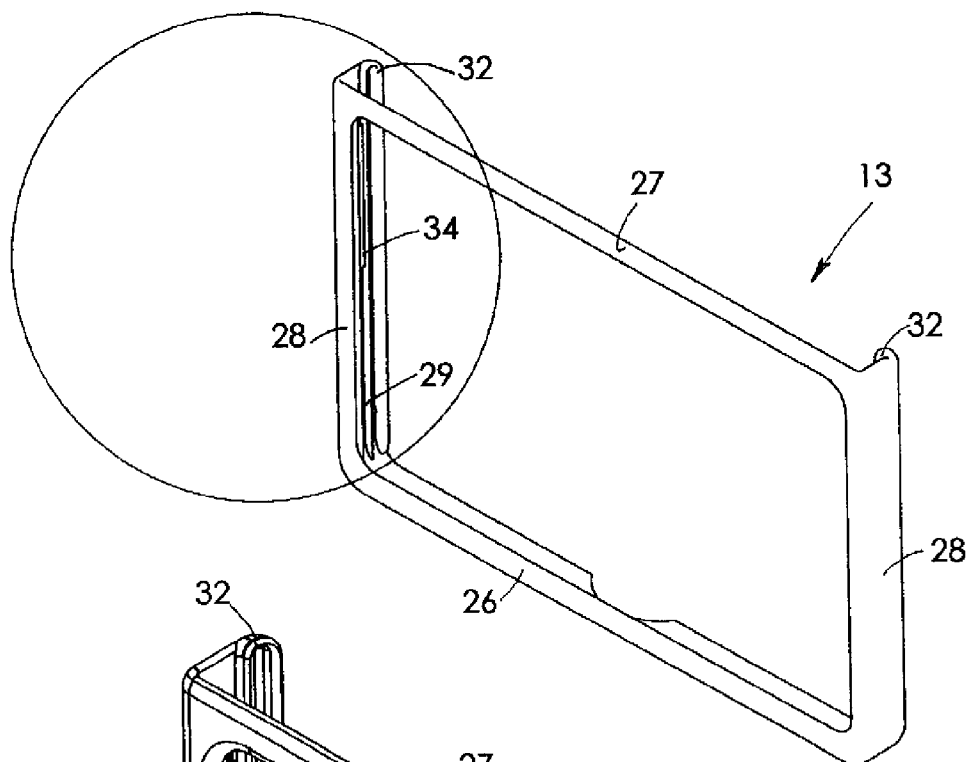
FIG. 45 is an inferior posterior perspective view of the first alternative cassette construction according to the present invention.
Figure 45A:
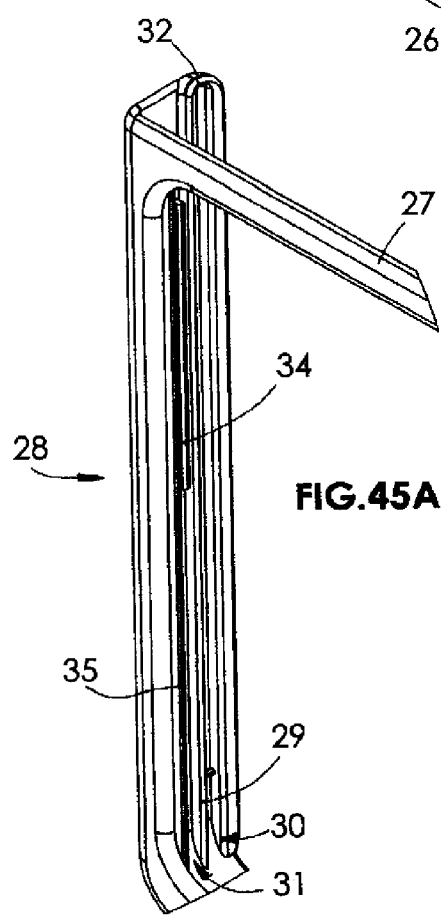
FIG. 45A is an enlarged fragmentary view of the leftmost lateral cassette section otherwise depicted in FIG. 45, the enlarged view being presented for greater clarity.
Figure 46:
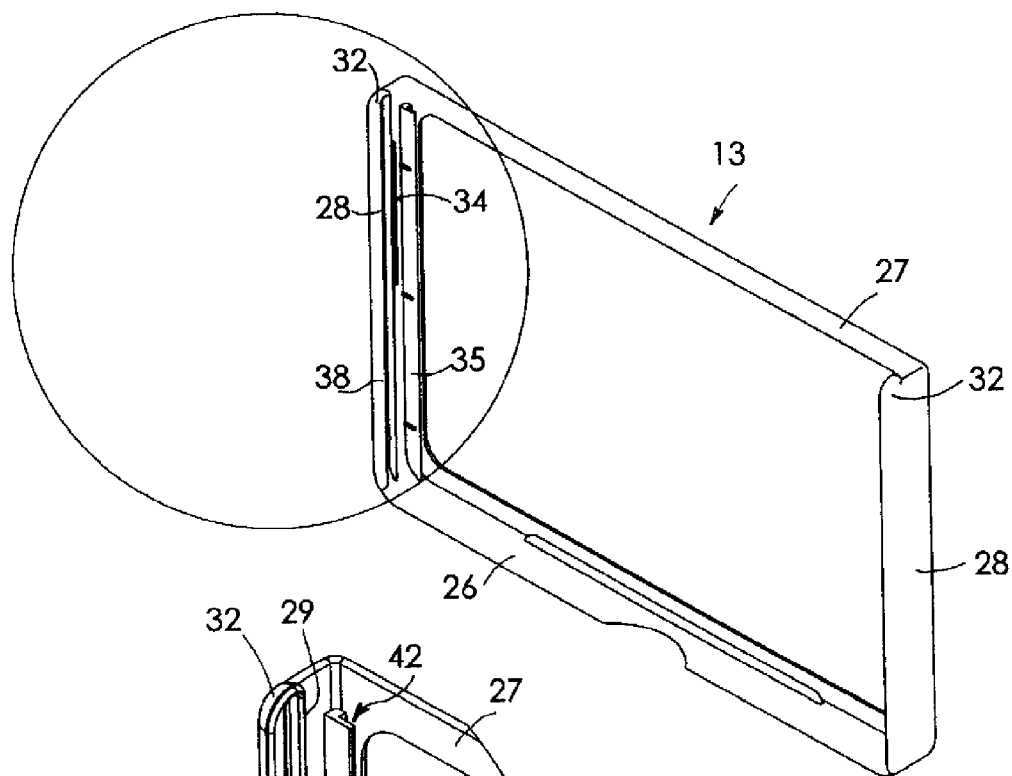
FIG. 46 is an inferior anterior perspective view of the first alternative cassette construction according to the present invention.
Figure 46A:
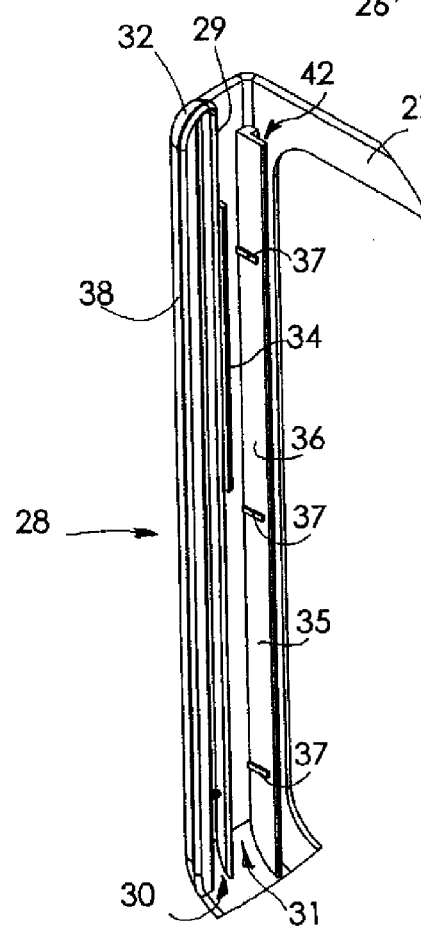
FIG. 46A is an enlarged fragmentary view of the leftmost lateral cassette section otherwise depicted in FIG. 46, the enlarged view being presented for greater clarity.
Figure 47:
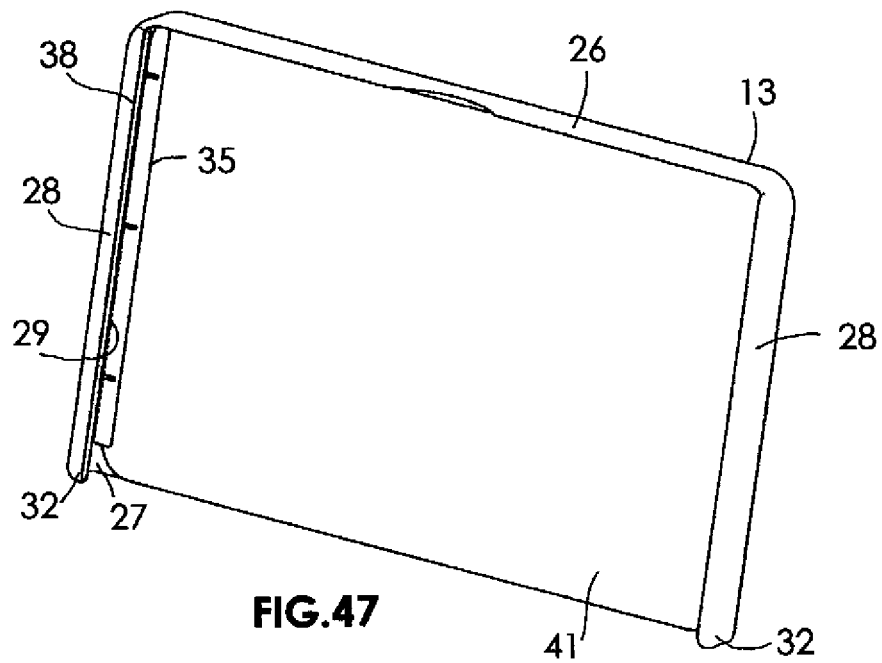
FIG. 47 is a first sequential superior anterior perspective view of the first alternative cassette construction according to the present invention showing an optional board or member received intermediate laterally-opposed secondary groove-defining flanges and posterior-most structure of the first alternative cassette construction.
Figure 48:
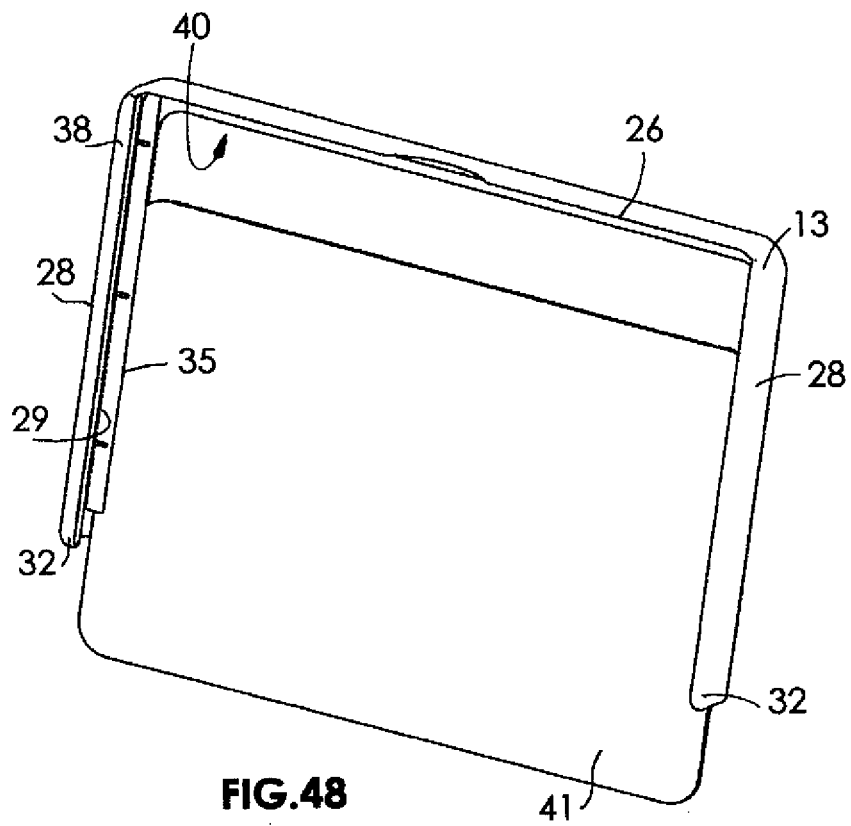
FIG. 48 is a second sequential superior anterior perspective view of the first alternative cassette construction according to the present invention showing the optional board or member in a first state of removal from the space intermediate the laterally-opposed secondary groove-defining flanges and posterior-most structure of the first alternative cassette construction.

Optionally, the cradle-cassette combination 10 according to the present invention may either comprise an open cassette construction as generally depicted in FIGS. 2, 3, 6, 8, 9, 10, 13, 16, 17, and 18 or a closed cassette construction as generally depicted in FIGS. 40 and 42. When provided with an open cassette construction the closed planar construction otherwise referenced at 39 in FIGS. 40 and 42 is removed thereby providing a cassette window as at 40.

When provided as an open cassette construction, the cradle-cassette combination 10 contemplates an optional window-filling member 41, which window-filling member 41 may be removably received posteriorly relative to the secondary groove-defining flanges 35 within a member-receiving groove 42 defined thereby. The posterior surfacing of the window-filling member 41 may be preferably or selectively colored for enhancing the appearance of said cradle-cassette combination 10 via the window 40.

When provided as a closed cassette construction, the cradle-cassette combination 10 preferably contemplates a posterior cassette section or side 24 comprising framing cassette surfacing as at 43 and receded cassette surfacing as at 44. The receded cassette surfacing 44 defines a member-receiving or board-receiving volume 45 central to the framing cassette surfacing 43 for receiving space-filling boards or members as at 46.

The space-filling boards or members 46 may thus be received in the board-receiving or member-receiving volumes 45 and attached to the underlying substrate(s) (e.g. adhesively or via some other similar fastening means not specifically illustrated) and comprise posterior board surfacing as at 47, which surfacing 47 is preferably flush with the framing cassette surfacing 43 when the space-filling board or member 46 is received in the board-receiving or member-receiving volume 45. Further, the posterior board surfacing 47 may preferably comprise select coloration for enhancing the appearance of the cassette construction 13 and/or the combination 10.

Similarly, the cradle construction 12 may preferably comprise framing cradle surfacing 48 and receded cradle surfacing 49 at both the anterior cradle section or side 14 and the posterior cradle section or side 16. The receded cradle surfacing 49 defines a member-receiving or board-receiving volume 50 central to the framing cradle surfacing 48 for receiving space-filling boards or members as at 51. The space-filling boards or members 51 may thus be received in the board-receiving volumes 50 and comprise outer board surfacing as at 52, which surfacing 52 is preferably flush with the framing cradle surfacing 48 when the boards or members 51 are received in the volumes 50. Further, the surfacing 52 may preferably comprise select coloration for enhancing the appearance of the cradle construction 12 and the combination 10.

The cradle construction 12 may further preferably comprise a series of device-cooperative apertures as variously reference in broken lines at 53, which device-cooperative apertures 53 may well cooperate with certain functional features of said electronic device 11 when received by the cradle construction 12. In this regard, it is noted that electronic devices very often incorporate camera lenses or speaker sections, for example.

The device-cooperative apertures 53 may thus be provided to cooperate with the function features for letting audio, visual and/or tactile information or signals to pass therethrough. The broken line depictions are presented for the purpose of illustrating the type of apertures here being discussed and are not meant to structurally limit the apertures to any particular structural formation made part of the combination 10.

The cradle construction 12 may further preferably comprise certain device-retention means cooperably associated with the anterior cradle section is side 14. The device-retention means basically function to prevent inadvertent removal of the electronic device 11 from the cradle construction 12 when received thereby. The device-retention means may be preferably defined or exemplified by an inferiorly extending superior retention tab 54 and laterally opposed superiorly extending inferior retention tabs 55. The superior retention tab 54 is preferably spaced equidistant intermediate the laterally opposed cradle sections 20, and the inferior retention tabs 55 are preferably, equally and respectively spaced from the laterally opposed cradle sections 20.

While the above descriptions contain much specificity, this specificity should not be construed as limitations on the scope of the invention, but rather as an exemplification of the invention. The basic invention may be said to essentially teach or disclose a cradle-cassette combination or apparatus for encasing and selectively displaying an electronic device. The cradle-cassette combination or apparatus according to the present invention preferably comprises a cradle construction, a cassette construction, and certain hinge-axis enabling means cooperatively associated therewith for enabling rotation of the cradle construction relative the cassette construction when extended therefrom.

The cradle construction is preferably sized and shaped to removably receive or cradle an electronic device, and comprises an anterior cradle section or side, a posterior cradle section or side, a superior cradle section or end, an inferior cradle section or end, and laterally opposed lateral cradle sections or sides. The cassette construction is preferably sized and shaped to translatably or displaceably receive the cradle construction, and comprises an anterior cassette section or side, a posterior cassette section or side, a superior cassette section or end, an inferior cassette section or end, and laterally opposed lateral cassette sections or sides.

The hinge-axis enabling means are preferably cooperatively associated with the lateral cradle and cassette sections at the superior cradle and cassette sections. The cradle construction is displaceable or translatable relative to the cassette construction for placing said cradle-cassette combination in either a cradle-closed configuration or a cradle-exposed configuration. The cradle construction is rotatable via the hinge axis-enabling means when the superior cradle and cassette sections are juxta-positioned.

The cradle construction is thereby positionable intermediate a cradle-extended position and the cradle-exposed configuration or position. The anterior cradle section and posterior cassette section face in the same direction when in the cradle-exposed configuration or position; and the anterior cradle section and anterior cassette section face in opposing directions when in the cradle-closed configuration or position.

The hinge-axis enabling means preferably comprise or are exemplified by (a) coaxially aligned posts extending laterally from the lateral cradle sections at the superior cradle section and (b) (anterior) grooves formed in the lateral cassette sections. The anterior grooves being separated from certain posterior grooves via primary groove-defining flanges formed in the lateral cassette sections. The posts are translatable and rotatable within the anterior grooves to effect the hinge-axis enabling means.

The cradle construction may further preferably comprises laterally opposed cradle flanges at the anterior cradle section and the lateral cassette sections each comprise a secondary groove-defining flange. The secondary groove-defining flanges comprise anterior flange surfacing, which anterior flange surfacing is preferably outfitted with certain spacer means for spacing the cradle flanges in anterior adjacency to the secondary groove-defining flanges when in the cradle-closed position.

Noting that the cradle flanges are translatably received within the posterior grooves when in the cradle-closed position, the lateral cassette sections each comprise a tertiary guide flange, which tertiary guide flanges extend medially for guiding the cradle flanges when displacing or translating within the posterior grooves in anterior adjacency to said spacer means.

The posterior cassette section may further preferably comprise certain framing cassette surfacing and certain receded cassette surfacing, while the anterior and posterior cradle sections may further preferably comprise certain similar framing cradle surfacing and certain similar receded cradle surfacing. The receded cassette and cradle surfacing define certain board-receiving or member-receiving volumes central to the framing cassette and cradle surfacing for receiving (color-enhanced) space-filling boards or members for providing the combination or apparatus with certain color-enhancements.

Stated another way, the cradle-cassette combination or apparatus according to the present invention is basically designed to encase and selectively display an electronic device. To achieve these primary objectives, the cradle construction is sized and shaped to removably receive an electronic device, and the cassette construction is sized and shaped to translatably receive the cradle construction.

Hinge-axis enabling means are cooperatively associated with the cradle and cassette constructions sections both (a) for rendering the cradle construction displaceable relative to the cassette construction and (b) for placing said cradle-cassette combination into either (i) a cradle-closed configuration or (ii) a cradle-exposed configuration. In this regard, the cradle construction is selectively rotatable via the hinge axis-enabling means, and thereby positionable intermediate said configurations.

Accordingly, although the inventive apparatus or combination has been described by reference to a number of embodiments, it is not intended that the novel combination or apparatus be limited thereby, but that modifications thereof are intended to be included as falling within the broad scope and spirit of the foregoing disclosure, the following claims, and the appended drawings.

I claim:

1. A cradle-cassette combination for encasing and selectively displaying an electronic device, the cradle-cassette combination comprising:

a cradle construction, the cradle construction being sized and shaped to removably receive an electronic device, the cradle construction comprising an anterior cradle section, anterior cradle surfacing, a posterior cradle section, posterior cradle surfacing, a superior cradle section, an inferior cradle section, laterally-opposed lateral cradle sections, and a hinge axis of rotation, the lateral cradle sections each comprising hinge axis-enabling posts adjacent the superior cradle section, the hinge axis-enabling posts extending laterally and being coaxial; and a cassette construction, the cassette construction being sized and shaped to translatably receive the cradle construction, the cassette construction comprising an anterior cassette section, anterior cassette surfacing, a posterior cassette section, posterior cassette surfacing, a superior cassette section, an inferior cassette section, and laterally-opposed lateral cassette sections, the laterally-opposed lateral cassette sections each comprising a primary groove-defining flange, the primary groove-defining flanges extending medially for defining laterally-opposed posterior grooves and laterally-opposed anterior grooves;

the hinge axis-enabling posts being translatably received at the laterally-opposed lateral cassette sections within the anterior grooves, the cradle construction thus being translatably displaceable relative to the cassette construction for selectively positioning said cradle-cassette combination intermediate a cradle-closed configuration and a cradle-exposed configuration, the cradle construction being rotatable about the hinge axis of rotation via the hinge axis-enabling posts when said posts are positioned at the superior cassette section, the cradle construction thereby being rotatably positionable intermediate the cradle-closed configuration and the cradle-exposed configuration, the anterior cradle surfacing and anterior cassette surfacing facing in the same direction when in the cradle-exposed configuration, the anterior cradle surfacing and anterior cassette surfacing facing in opposite directions when in the cradle-closed configuration.

2. The cradle-cassette combination of claim 1 wherein the lateral cassette sections comprise post-stop structures at the superior cassette section, the post-stop structures for preventing translatable movement of the hinge axis-enabling posts therepast.

3. The cradle-cassette combination of claim 1 wherein the cradle construction comprises laterally-opposed, laterally-extending cradle flanges at the anterior cradle section and the laterally-opposed lateral cassette sections each comprise a medially-extending secondary groove-defining flange, the secondary groove-defining flanges for spacing the cradle construction from the anterior cassette surfacing of the posterior cassette section when in the cradle-closed configuration.

4. The cradle-cassette combination of claim 3 wherein the secondary groove-defining flanges comprise anterior flange surfacing, the anterior flange surfacing being outfitted with spacer structures for preventing the cradle flanges from contacting the secondary groove-defining flanges when in the cradle-closed position.

5. The cradle-cassette combination of claim 3 wherein the laterally-opposed lateral cassette sections provide laterally opposed flange seats at anterior surfacing thereof, the laterally-opposed, laterally-extending cradle flanges being receivable upon the flange seats when the cradle-cassette combination is in the cradle-exposed position.

6. The cradle-cassette combination of claim 3 wherein the laterally-opposed, laterally-extending cradle flanges are translatably received within the posterior grooves when in the cradle-closed configuration and the laterally-opposed lateral cassette sections each comprise a tertiary guide flange, the tertiary guide flanges extending medially for guiding the laterally-opposed, laterally-extending cradle flanges when translating within the posterior grooves.

7. The cradle-cassette combination of claim 1 wherein the posterior cassette section comprises framing cassette surfacing and receded cassette surfacing, and the anterior and posterior cradle sections each comprise framing cradle surfacing and receded cradle surfacing, the receded cassette surfacing and the receded cradle surfacing defining member-receiving volumes central to the framing cassette surfacing and the framing cradle surfacing for receiving space-filling members.

8. The cradle-cassette combination of claim 7 comprising, in combination, said space-filling members, the space-filling members being received in the member-receiving volumes and comprising member surfacing, the member surfacing being flush with the framing cassette surfacing and the framing cradle surfacing.

9. The cradle-cassette combination of claim 8 wherein the member surfacing is selectively colored for enhancing the appearance of said cradle-cassette combination.

10. The cradle-cassette combination of claim 1 wherein the cradle construction is positionable obliquely relative to the cassette construction intermediate the cradle-closed configuration and the cradle-exposed configuration for enabling a user to support the cradle-cassette combination upon a support surface in a select support position, the select support position being selected from the group consisting of an end-based stand position and a laterally-based stand position.

11. A cradle-cassette combination for encasing and selectively displaying an electronic device, the cradle-cassette combination comprising:

a cradle construction, the cradle construction being sized and shaped to removably receive an electronic device, the cradle construction comprising an anterior cradle section, a posterior cradle section, a superior cradle section, an inferior cradle section, and-laterally-opposed, lateral cradle sections;

a cassette construction, the cassette construction being sized and shaped to translatably receive the cradle construction, the cassette construction comprising an anterior cassette section, a posterior cassette section, a superior cassette section, an inferior cassette section, and laterally-opposed, lateral cassette sections;

a hinge axis of rotation; and hinge-axis enabling means cooperatively associated with the lateral cradle and cassette sections, the cradle construction being translatably displaceable relative to the cassette construction for positioning said cradle-cassette combination in either a cradle-closed configuration or a cradle-exposed configuration, the cradle construction being rotatable about the hinge axis of rotation via the hinge axis-enabling means, the cradle construction thereby being rotatably positionable intermediate a cradle-extended configuration and the cradle-exposed configuration, the anterior cradle section and anterior cassette sections facing in the same direction when in the cradle-exposed configuration, the anterior cradle section and anterior cassette section facing in opposite directions when in the cradle-closed configuration.

12. The cradle-cassette combination of claim 11 wherein the hinge-axis enabling means comprise (a) coaxially aligned posts extending laterally from the lateral cradle sections at the superior cradle section and (b) grooves being formed in the lateral cassette sections, the posts being translatable and rotatable within the grooves.

13. The cradle-cassette combination of claim 11 wherein the cradle construction comprises laterally opposed cradle flanges and the lateral cassette sections each comprise at least one groove-defining flange, the at least one groove-defining flange for spacing the cradle flanges from portions of the cassette construction when in the cradle-closed configuration.

14. The cradle-cassette combination of claim 11 wherein a select construction comprises framing surfacing and receded surfacing, the select construction being selected from the group consisting of the cradle construction and the cassette construction, the receded surfacing defining a member-receiving volume central to the framing surfacing for receiving a space-filling member.

15. The cradle-cassette combination of claim 14 comprising, in combination, at least one space-filling member, the at least one space-filling member being receivable in the member-receiving volume.

16. The cradle-cassette combination of claim 15 wherein the at least one space-filling member comprises member surfacing, the member surfacing being flush with the framing surfacing.

17. The cradle-cassette combination of claim 13 wherein the lateral cassette sections each comprise a guide flange, the guide flanges extending medially for guiding the cradle flanges.

18. A cradle-cassette apparatus for encasing and selectively displaying an electronic device, the cradle-cassette apparatus comprising:
  a cradle construction, the cradle construction being sized and shaped to removably receive an electronic device, the cradle construction comprising an anterior cradle section, a posterior cradle section, a superior cradle section, an inferior cradle section, and laterally opposed lateral cradle sections;
  a cassette construction, the cassette construction being sized and shaped to translatably receive the cradle construction, the cassette construction comprising an anterior cassette section, a posterior cassette section, a superior cassette section, an inferior cassette section, and laterally opposed lateral cassette sections;
  a hinge axis of rotation; and
  hinge-axis enabling means cooperatively associated with the lateral cradle and cassette sections, the cradle construction being displaceable and rotatable relative to the cassette construction for positioning said cradle-cassette combination in either a cradle-closed position or a cradle-exposed position, the anterior cradle and cassette sections facing in the same direction when in the cradle-exposed position, the anterior cradle and cassette sections facing in opposite directions when in the cradle-closed position.

19. The cradle-cassette apparatus of claim 18 wherein the hinge-axis enabling means comprise coaxially aligned posts and laterally opposed grooves, the coaxially aligned posts being translatable and rotatable within the laterally opposed grooves.

20. The cradle-cassette apparatus of claim 19 wherein the coaxially aligned posts extend laterally from the lateral cradle sections and the laterally opposed grooves are formed in the lateral cassette sections.

* * * * *